United States Patent
Litman

(10) Patent No.: US 6,873,794 B2
(45) Date of Patent: *Mar. 29, 2005

(54) COUPLED RANGEFINDER/PARALLAX 4×5 CAMERA

(76) Inventor: Guillermo E. Litman, 45-18 Person St., Long Island, NY (US) 11101

( * ) Notice: Subject to any disclaimer, the term of this patent is extended or adjusted under 35 U.S.C. 154(b) by 0 days.

This patent is subject to a terminal disclaimer.

(21) Appl. No.: 10/919,197

(22) Filed: Aug. 16, 2004

(65) Prior Publication Data

US 2005/0013607 A1 Jan. 20, 2005

Related U.S. Application Data

(60) Continuation of application No. 10/457,339, filed on Jun. 9, 2003, now Pat. No. 6,778,772, which is a division of application No. 10/095,634, filed on Mar. 11, 2002, now Pat. No. 6,608,971.
(60) Provisional application No. 60/274,987, filed on Mar. 12, 2001.

(51) Int. Cl.[7] .............................................. G03B 17/02
(52) U.S. Cl. ...................... 396/140; 396/360; 396/446; 396/541
(58) Field of Search ................................ 396/140–149, 396/429, 439, 535, 536, 538, 541, 544

(56) References Cited

U.S. PATENT DOCUMENTS

| 3,266,396 A | * | 8/1966 | Padelt ........................ 396/446 |
| 3,491,671 A | * | 1/1970 | Engeldrum .................. 396/446 |
| 4,648,696 A | * | 3/1987 | Park et al. .................. 396/446 |
| 6,608,971 B2 | * | 8/2003 | Litman ....................... 396/140 |
| 6,778,772 B2 | * | 8/2004 | Litman ....................... 396/140 |

* cited by examiner

*Primary Examiner*—David M. Gray
(74) *Attorney, Agent, or Firm*—Howard C. Miskin, Esq.; Gloria Tsui-Yip, Esq.

(57) ABSTRACT

A different size format camera utilizing the body shell of a 3¼×4¼ format camera and an adaptor that changes a 3¼×4¼ format photographic system to a different size film format. In particular, a coupled rangefinder/parallax camera that utilizes components from Polaroid Models 110, 110A, 110B, 120, 900 and 150 cameras and the adaptor.

19 Claims, 33 Drawing Sheets

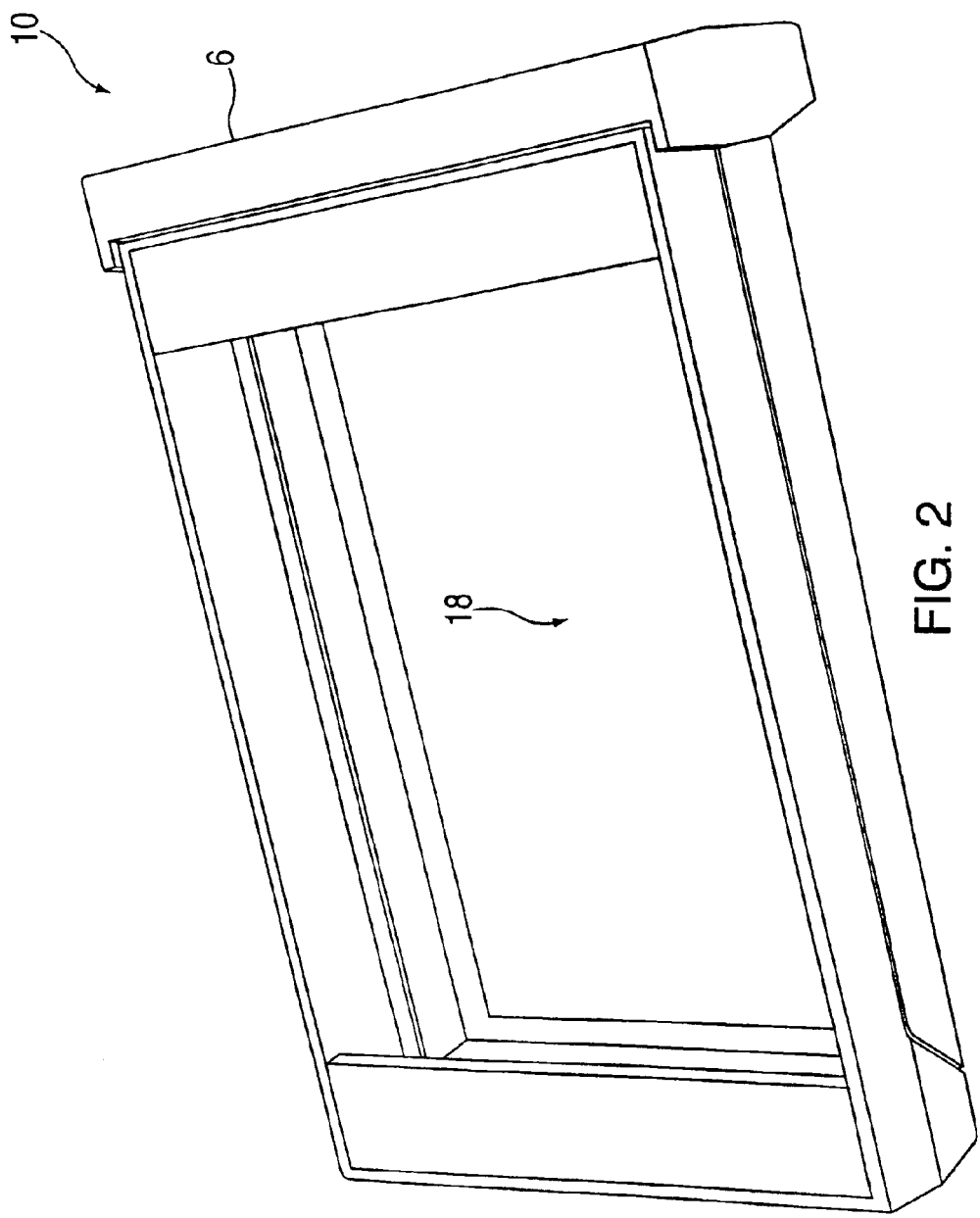

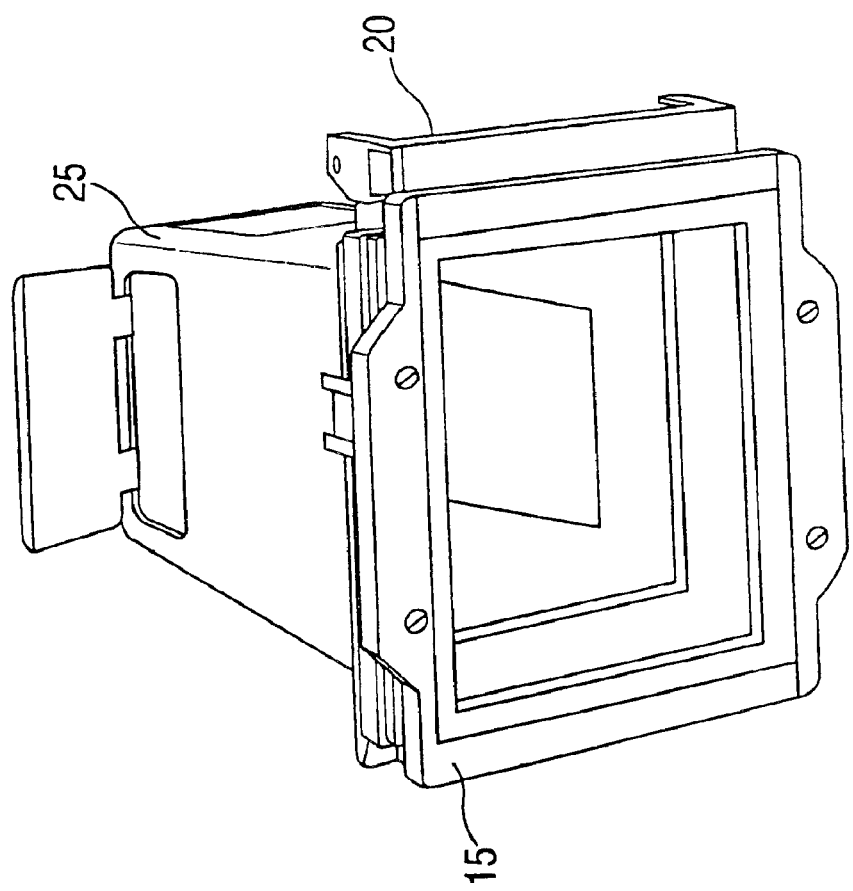
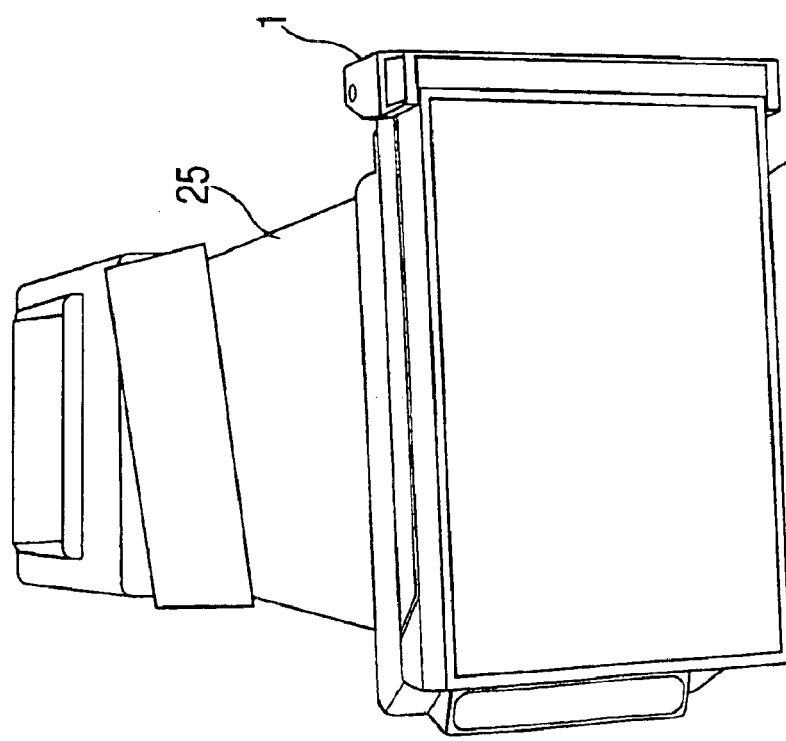
FIG. 5B
FIG. 5A

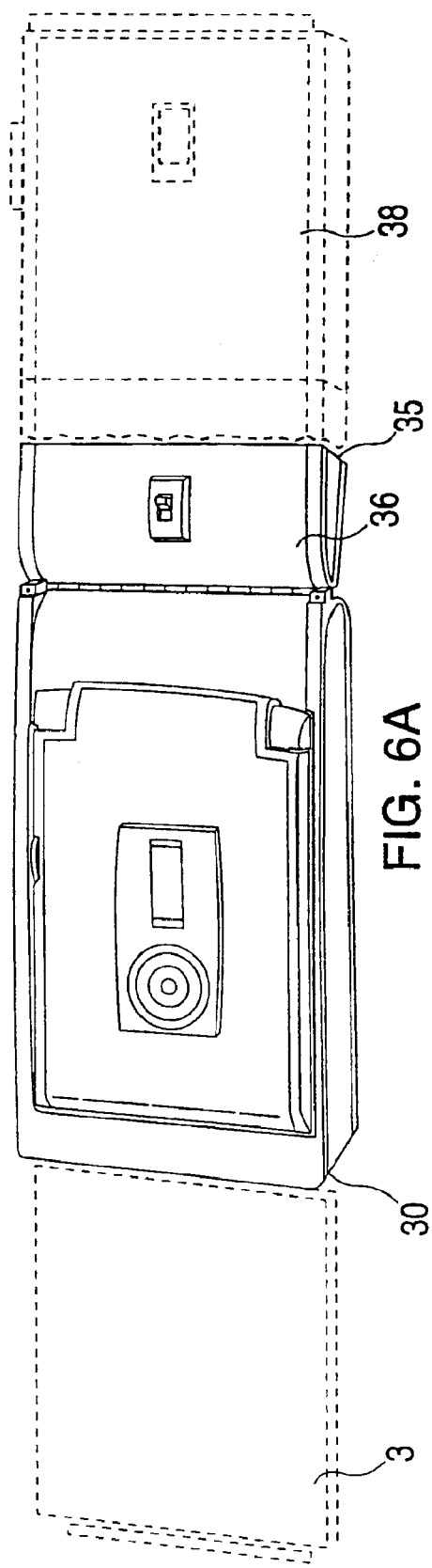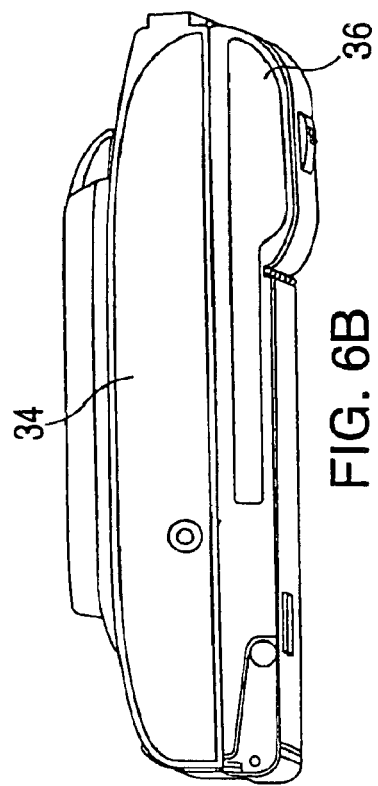
FIG. 6A
FIG. 6B

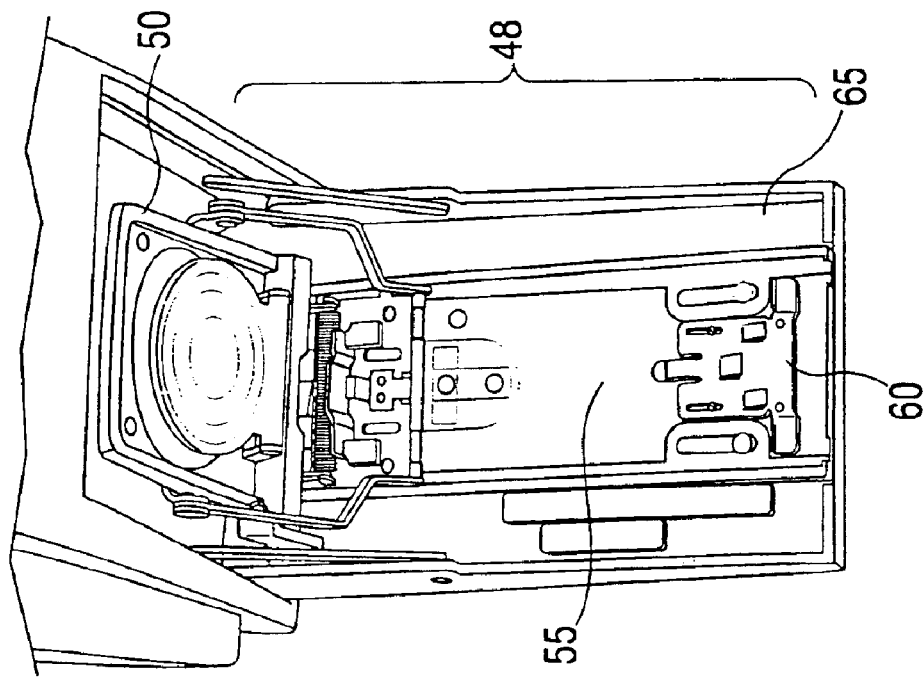
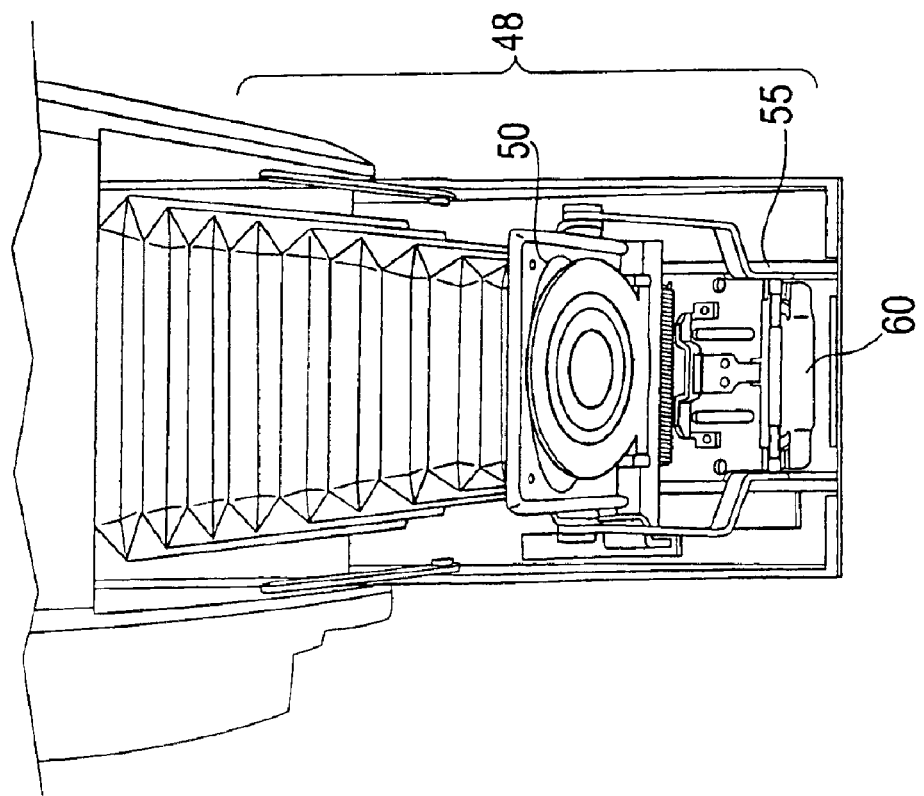

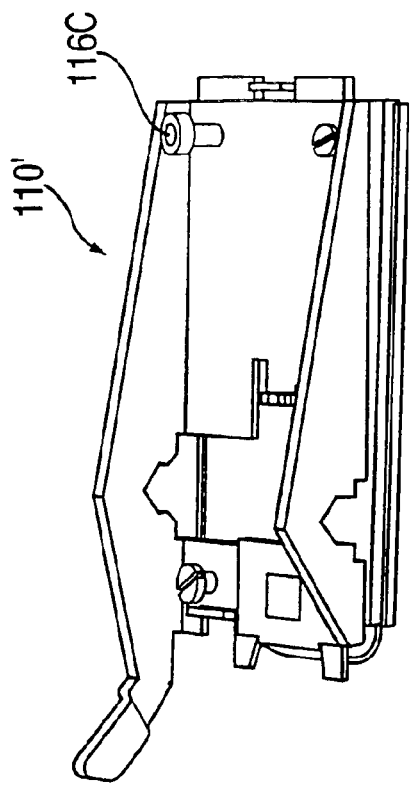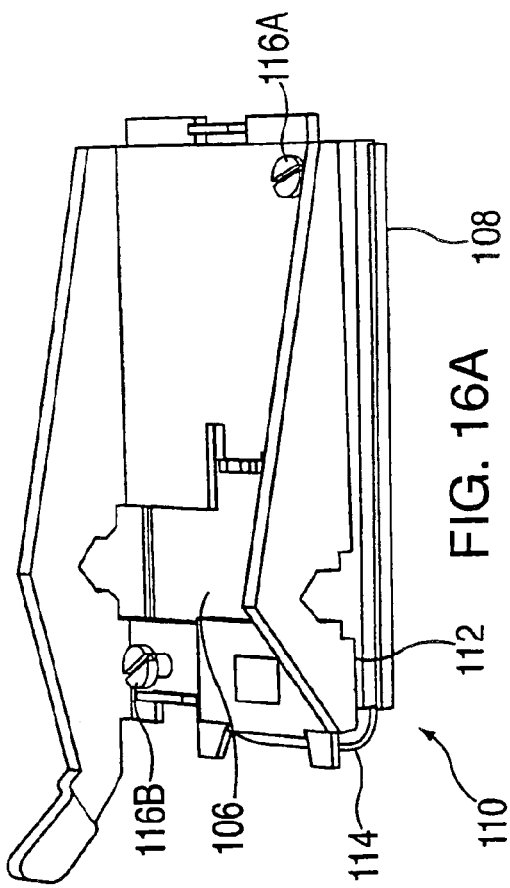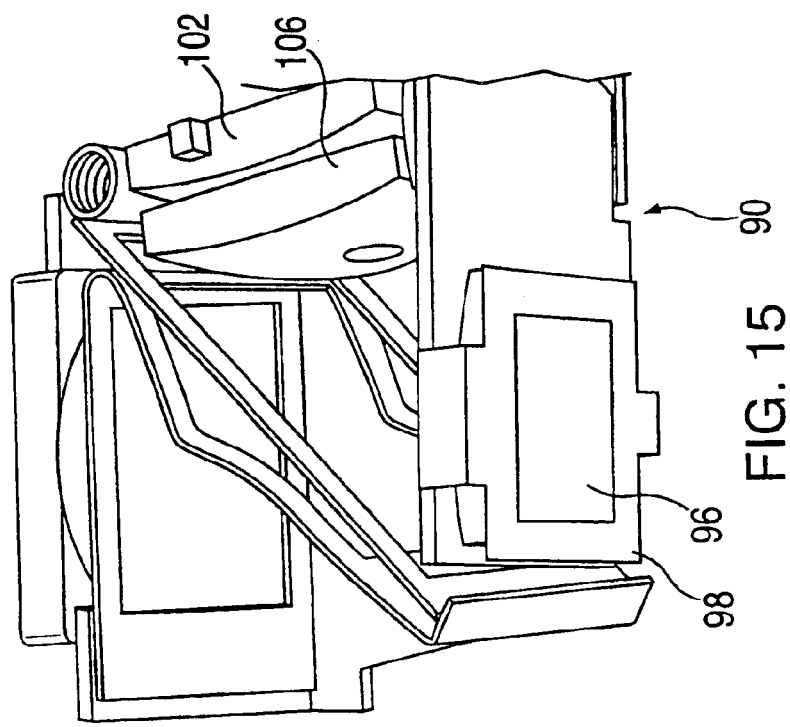

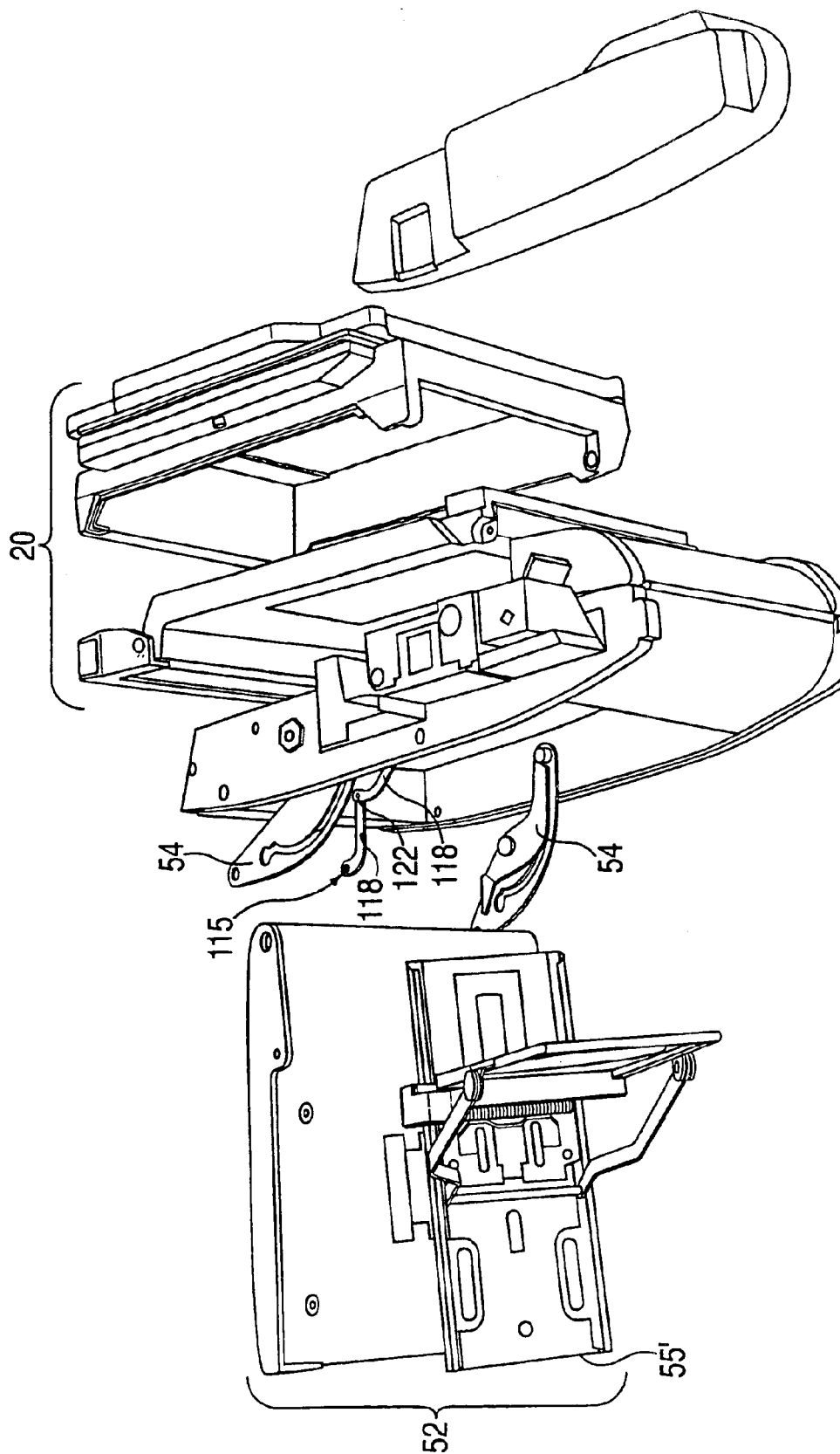

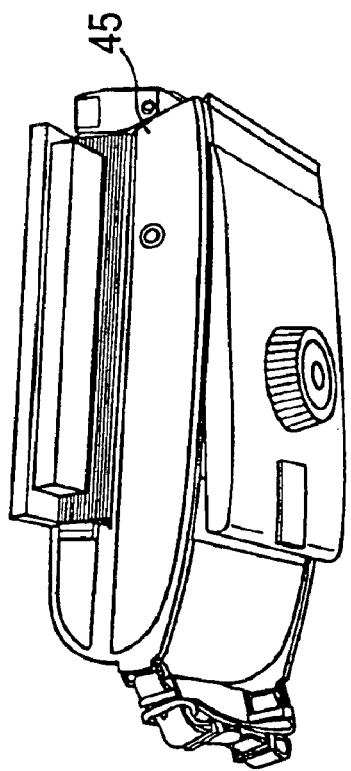
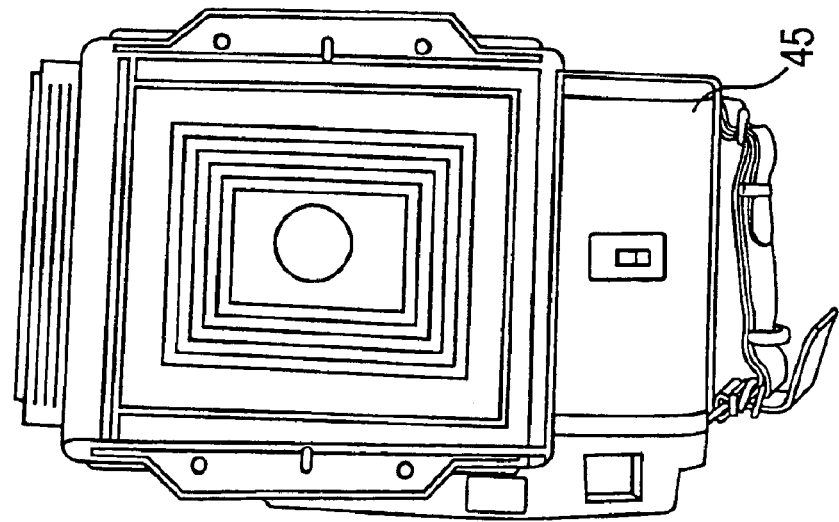

COUPLED RANGEFINDER/PARALLAX 4×5 CAMERA

This is a continuation of U.S. patent application Ser. No. 10/457,339, filed on Jun. 9, 2003, now U.S. Pat. No. 6,778,772, which is a divisional application of U.S. patent application Ser. No. 10/095,634, filed on Mar. 11, 2002, and issued as U.S. Pat. No. 6,608,971, which claims the benefit of U.S. Provisional Application No. 60/274,987, filed Mar. 12, 2001.

FIELD OF THE INVENTION

The invention relates to an interface for changing the film format of cameras and the modification of a 3¼"×4¼" format camera into a 4"×5" format camera utilizing such interface. In particular, the interface is a modification of a Polaroid CB 103 film magazine, which is designed for 3¼"×4¼" film format, to accept films in the 4"×5" film format.

BACKGROUND OF THE INVENTION

Different film formats exist for still photography to accommodate the needs and demands in the art of still photography. The most common small film format is the 35 mm used in common point and shoot camera. The medium film format is between 35 mm and 6 cm in height, which includes 6 cm×9 cm and 3¼"×4¼", which is commonly referred to as 3¼×4¼. The large film format is greater than 6 cm in height, which includes 4"×5", commonly referred to as 4×5, and 8"×10", commonly referred to as 8×10.

Larger film sizes provide better quality and more detail images. The largest practical format for a production hand held camera is the 4×5 format because of the limitation on the portability and maneuverability of the camera. An 8×10 format camera is heavy and cannot be used as a hand held camera.

All 4×5 camera in the marketplace have either a double window rangefinder that has one viewfinder window for framing the photograph and one rangefinder window for focusing or only has a rangefinder without parallax. Single window rangefinder/coupled rangefinder parallax combination camera exists for the 3¼×4¼ format, but not for the 4×5 format because of the tighter tolerances required for the 4×5 format camera and the need for highly skilled workers in the manufacturing process, making it economically impractical to manufacture. A coupled rangefinder/parallax combination camera provides the focusing system and crop lines which permit accurate composition via the rangefinder, i.e. can adjust the crop lines in the viewfinder when adjusting the focus on the subject to take a picture. Therefore, it is easier to adjust rangefinder and cropping frame because it uses only a single window rangefinder that includes both the parallax and the rangefinder.

Therefore, there is a need for a lightweight 4×5 camera having a single window rangefinder/coupled rangefinder parallax combination.

SUMMARY OF THE INVENTION

The invention provides an interface and single window rangefinder 4×5 camera by converting existing products designed for the 3¼×4¼ format.

One aspect of the invention is the modification of a film magazine processing back designed for the 3¼×4¼ format produced by Polaroid Corporation of Cambridge, Mass., called the Model CB 103 camera back for pack films, into a CB 103 interface that may be adapted to accept different format films, including the 4×5 format.

Another aspect of the invention is the modification/combination of Polaroid's cameras that accept series 40 roll film (which is out of production and was in the 3¼×4¼ format) and did not allow the use of conventional wet film holder, such as Model 110/110A/110B/120/900/150/160/800, to a single window rangefinder 4×5 camera with the CB 103 interface.

A further aspect of the invention is the necessary improvements of the modified Polaroid Models 110/110A/110B/120/900/150/160/800 camera to allow it to become an operable coupled parallax/rangefinder 4×5 camera.

The CB 103 interface of the present invention comprises a frame that acts as a spacer for interconnecting two photographic components, such as a 4×5 format film and a camera that accepts the 3¼×4¼ format film magazine.

The single window rangefinder 4×5 camera of the present invention modifies the Polaroid Models 110/110A/110B/120/900/150/160/800 camera and utilizes the CB-103 interface to convert a 3¼×4¼ camera into a 4×5 camera with a coupled rangefinder/parallax combination that allows sequence shots taken at a higher speed than ever before possible for a 4×5 format, at about 1 shot/sec, and allows increased concentration on artistic aspect of picture taking and the ability to capture snap shots with spontaneity without asking the subject to wait until the camera is being readied. Additionally, the modified single window rangefinder 4×5 camera of the present invention provides a proper turn knob focusing system for accuracy and improved tolerances for a 4×5 format.

BRIEF DESCRIPTION OF THE DRAWINGS

FIG. 2 is a CB 103 interface modified from a CB 103 film magazine in accordance with the present invention.

FIGS. 5A and 5B illustrate the alternate use of a CB 103 film magazine or a 4×5 adaptor of the present invention, respectively, on similar cameras.

FIGS. 6A–6E show the steps of modifying a Polaroid 900 body shell to accept the CB103 interface and then the 4×5 adaptor for a coupled rangefinder/parallax 4×5 camera of the present invention.

FIGS. 12A–12B shows focusing system before modification.

FIG. 15 shows an improved coupled rangefinder/parallax of the present invention.

FIGS. 16A–16H show the components and improvement made to the secondary pivoting mirror assembly.

FIG. 18 shows the components of the coupled rangefinder/parallax 4×5 camera of the present invention.

DETAILED DESCRIPTION OF THE PREFERRED EMBODIMENTS

CB 103 Interface

Figure 1B:
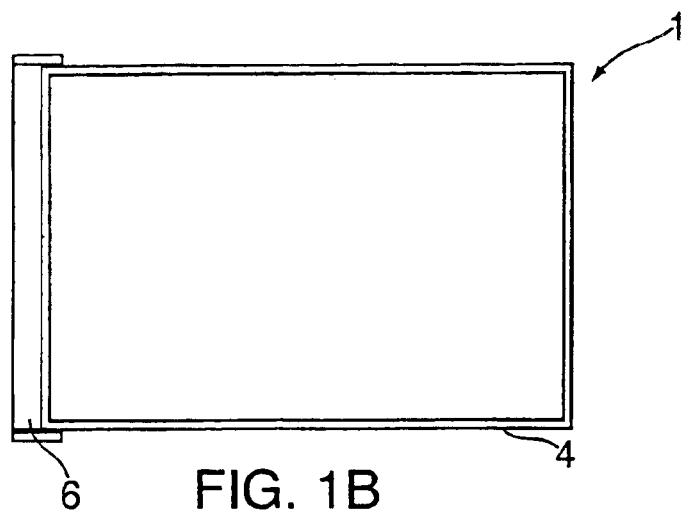
FIGS. 1A–1D show different views of a Polaroid Model CB 103 film magazine, in the open and closed position.
Figures 1E, 1F:
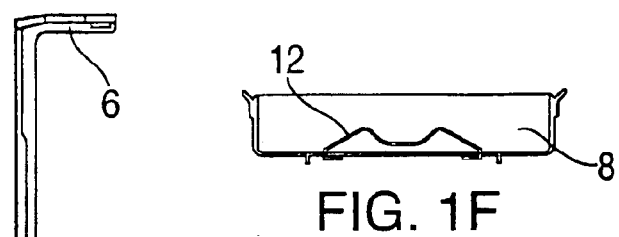
FIG. 1E shows the closing latch of the Model CB 103 film magazine.
FIGS. 1F and 1G shows different views of the pack film holder of the Model CB 103 film magazine.
Figure 1G:
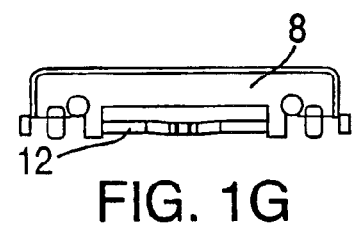
Figure 1A:
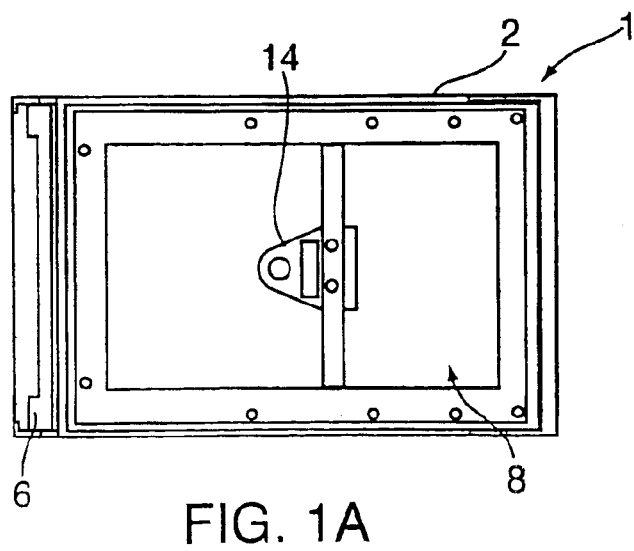
Figures 1C, 1D:
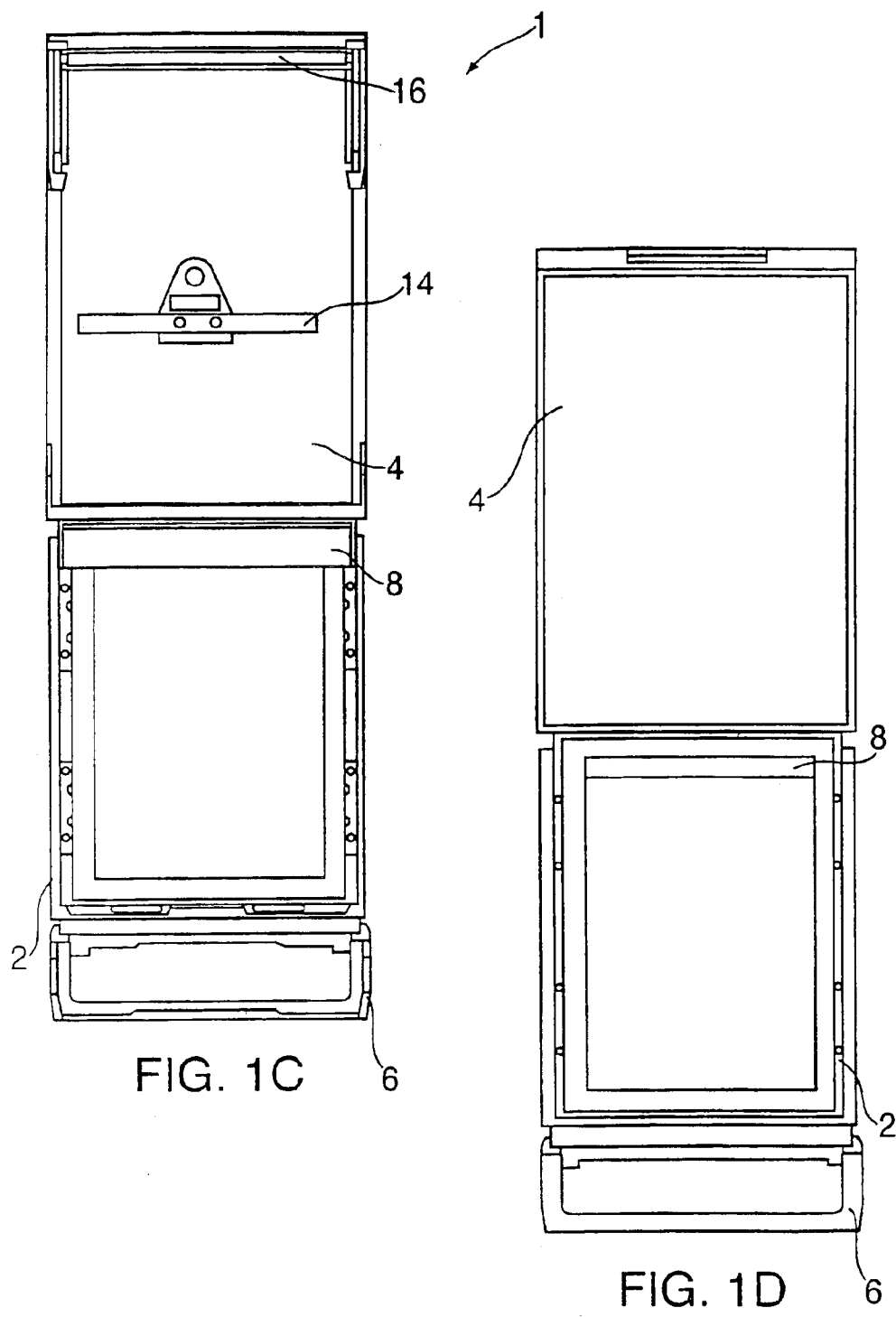

With reference to the drawing wherein the same reference number illustrates the same element throughout, FIGS. 1A–1D show a Polaroid CB 103 film magazine 1 for the 3¼×4¼ format pack film, which is to be modified to become a CB 103 interface 10. FIGS. 1A and 1B show the front and rear, respectively, of the CB 103 film magazine 1 in the closed position and FIGS. 1C and 1D show the front and rear, respectively, of the CB 103 film magazine 1 in the open position. The CB 103 film magazine 1 has a frame 2, which is pivotally connected to a rear door 4 on one end and to a closing latch 6 on the opposite end. FIG. 1E shows the closing latch 6 separated from the frame 2. As shown in FIGS. 1A and 1B, the rear door 4 rests on the frame 2 with the closing latch 6 latching over the rear door to keep the CB 103 film magazine 1 in the closed position. Mounted on the frame 2 at the pivoting point between the frame 2 and rear door 4 is a pack film holder 8. As shown in FIGS. 1F and 1G, pack film holder 8 has a pressure spring 12 for retaining a pack film (not shown), which is inserted into the pack film holder 8 when the CB 103 film magazine 1 is in the open position as shown in FIG. 1C. Upon closing the CB 103 film magazine 1, the pack film (not shown) rest against another pressure spring 14 mounted on the rear door 4. Also mounted on the rear door 4 adjacent the end opposite from the frame 2 is a pair of film development rollers 16. When in use, after photographing an image on a pack film, a photograph exits the CB 103 film magazine 1 through the film development rollers 16 and an exiting slot (not shown) on the side of the rear door 4.

The modification of the CB 103 film magazine 1 shown in FIGS. 1A–1D, to a CB 103 interface 10, as shown in FIG. 2, requires the removal of the film development rollers 16 and milling an opening 18 in the rear door 4. The CB 103 interface 10 interfaces a camera that accepts a CB 103 film magazine 1 and another camera back having a different film format, such as a film holder, a film holder receiving apparatus or a 4×5 frame. Additionally, the CB 103 interface 10 acts as a spacer to advantageously increase the distance between the lens and the film plane. The milled opening 18 is preferably centered on the rear door 4 such that when CB 103 interface 10 is mounted onto a camera (not shown), the projected image will properly travel through the milled opening 18 onto the film while maintaining and respecting the functions of the parallax system of the camera with the increased distance between the lens and the film plane. Depending on the focal distance of the lens and the size of the film being used on the camera, the thickness or depth of the CB 103 interface 10 may be increased from the distance between the lens and the film plane for proper function of the parallax system on the camera and the proper image size for the specific format film. CB 103 interface 10 as shown in FIG. 2 has a milled opening 18 of approximately 4"×5" for adapting to a 4×5 format. Different sized opening 18 may be milled for different purposes, e.g. 35 mm, 6 cm×9 cm, 5×7, etc.

Although the CB 103 interface 10 of the present invention is described above as a modification of the CB 103 film magazine 1, other similarly sized frame with structure similar to the CB 103 interface 10 may be used as such an interface 10. The minimum thickness or depth of the interface 10 of the present invention is ⅜ inch to provide the minimum increased distance between the lens and the film plane for proper projection of an image onto the film.

4×5 Adaptor Using CB 103 Interface

Figure 3A:
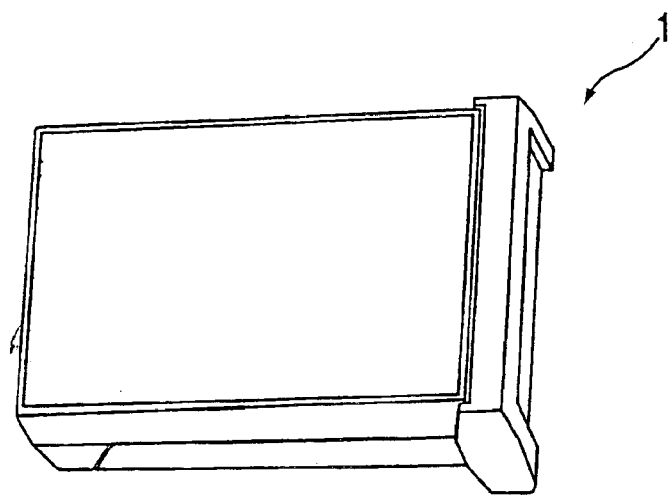
FIGS. 3A–3F show the steps of modifying a CB 103 film magazine into a CB 103 interface and then into a 4×5 adaptor in accordance with the present invention.
Figure 3B:
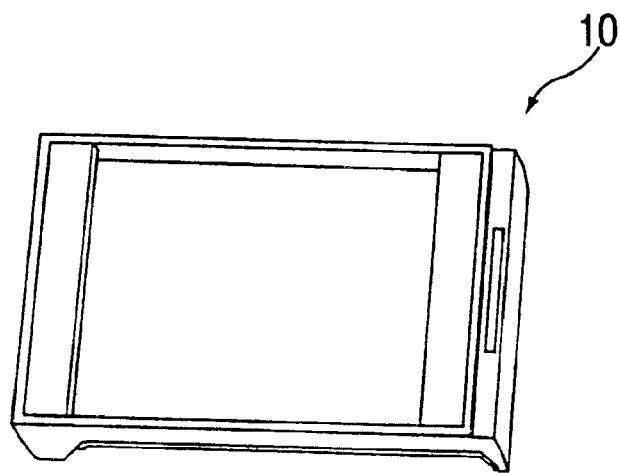
Figure 3C:
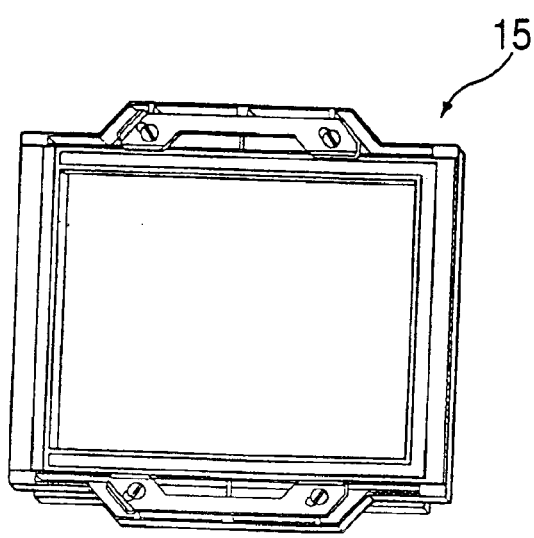
Figure 3D:
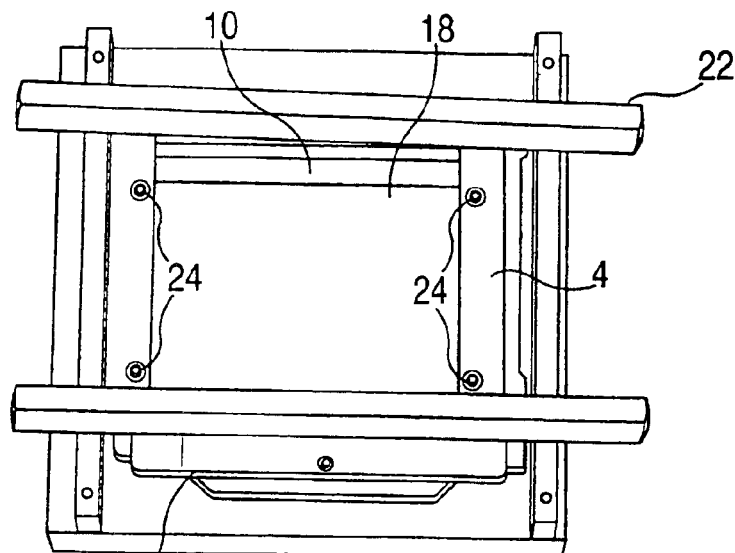
Figure 3E:
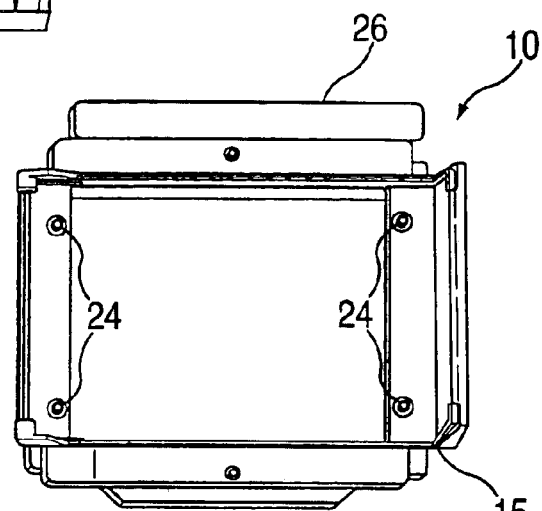
Figure 3F:
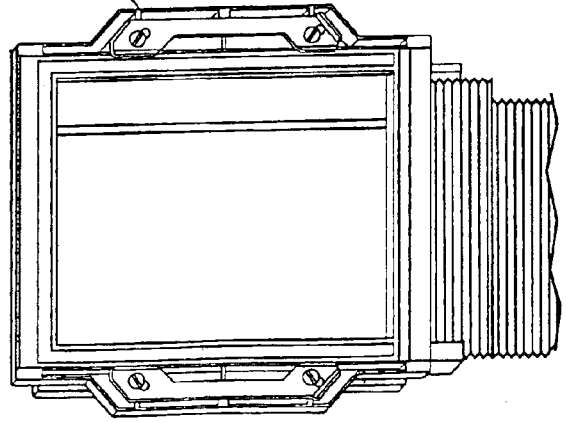
Figure 4A:
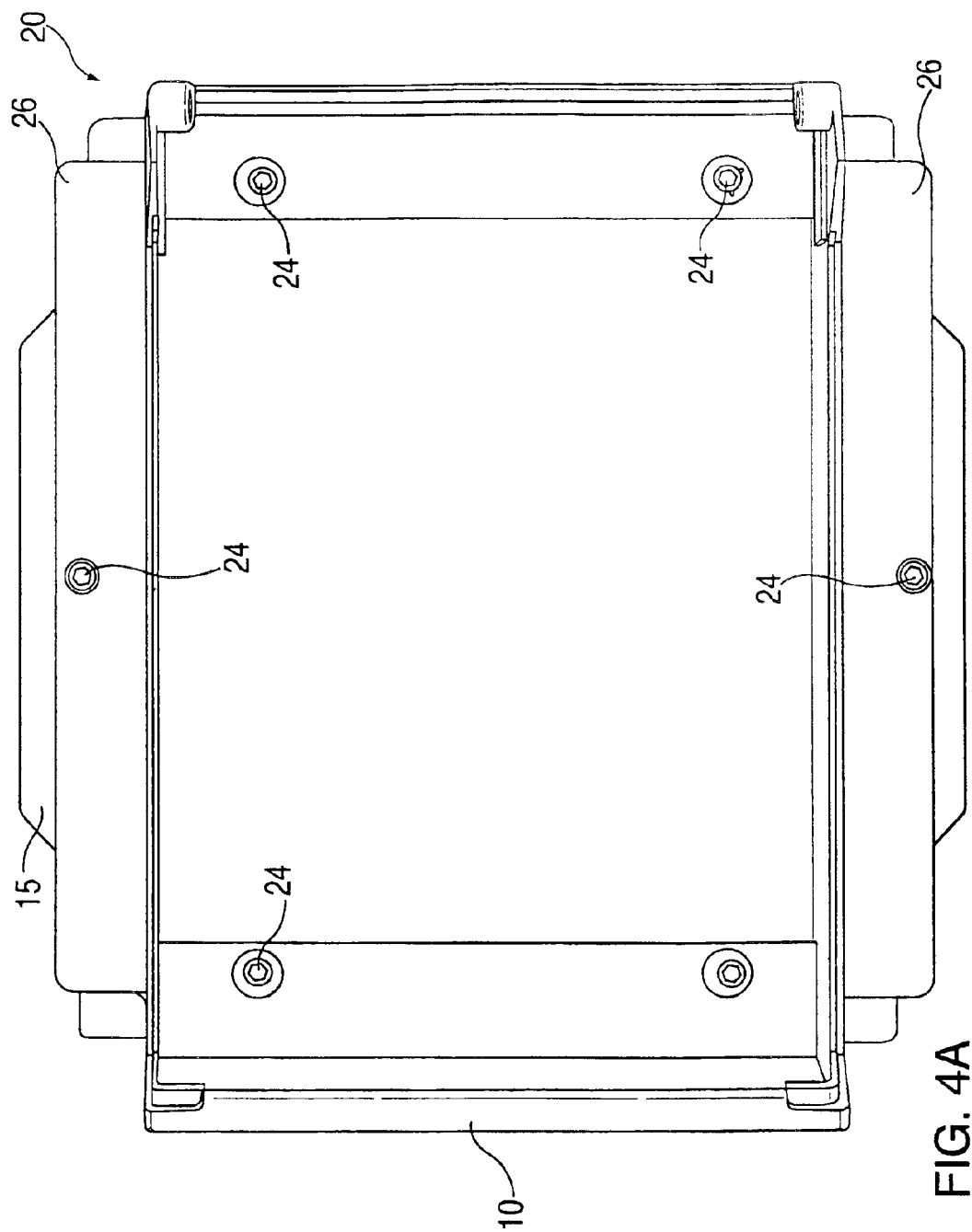
FIGS. 4A and 4B shows two different views of the 4×5 adaptor of the present invention.
Figure 4B:
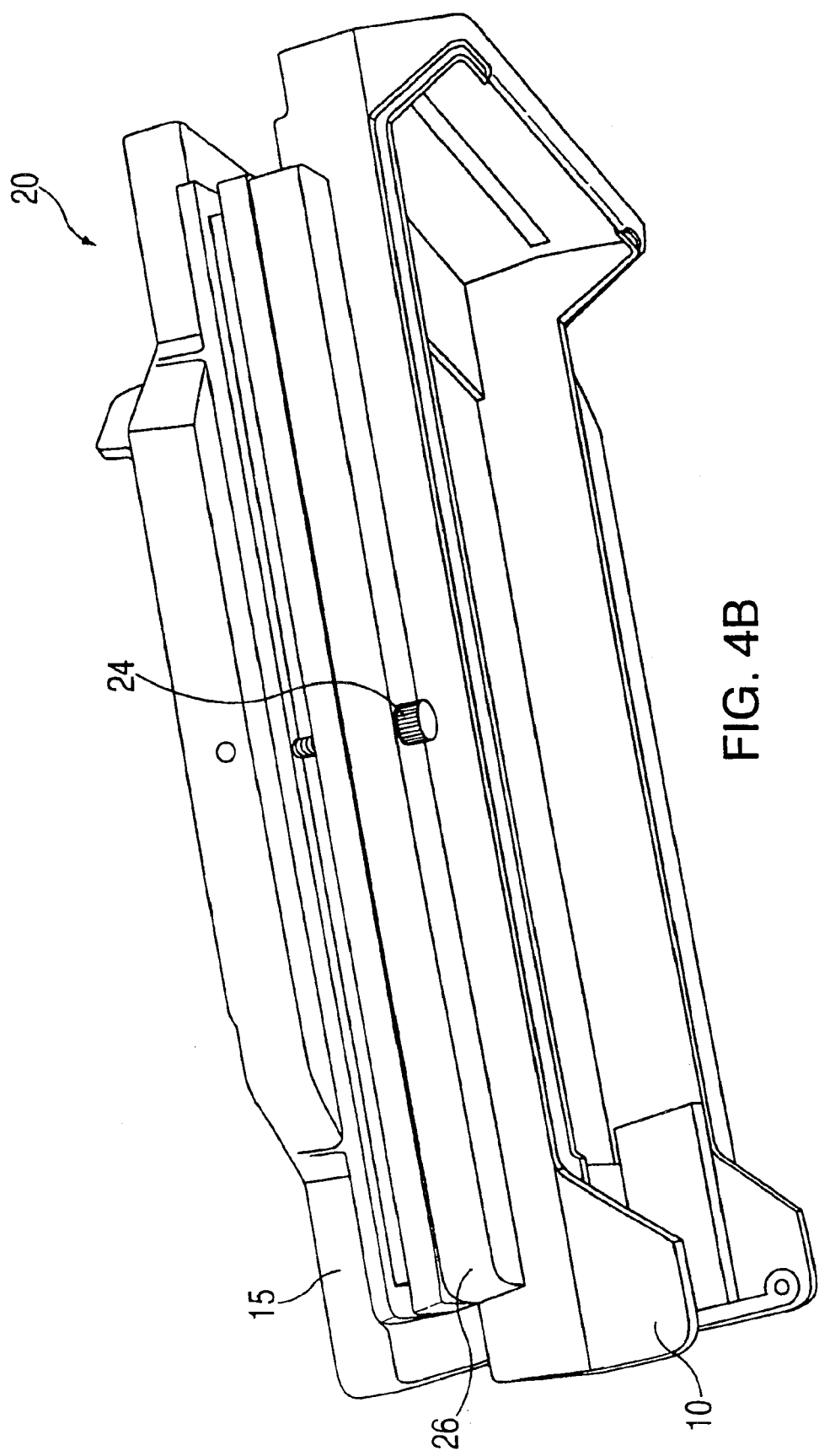

FIGS. 3A–3F shows the different steps in modifying a CB 103 film magazine 1 into a CB 103 interface 10 and then into a 4×5 adaptor 20. FIG. 3A is similar to FIG. 1B and shows a CB 103 film magazine 1. FIG. 3B is similar to FIG. 2 and shows a CB 103 interface 10. Although a CB 103 interface 10 is described herein for the 4×5 adaptor 20, other similarly sized and structured interface 10 may be used. FIG. 3C shows a standard 4×5 connecting frame 15, Horseman Model No. 23707, manufactured by Komamura Photographic Co., Ltd., which is a Graflock back that accepts regular two sided 4×5 cut film. Other camera backs or 4×5 frames from other manufacturers can also be used. As shown in FIG. 3D, the 4×5 connecting frame 15 is placed under and adjacent the milled opening 18 of the rear door 4 of CB 103 interface 10. A template 22 for proper alignment of connecting frame 15 and CB 103 interface 10 is used. The connecting frame 15 is connected to the CB 103 interface 10 with four (4) screws 24 with black RTV silicone seal therebetween to trap light. As shown in FIG. 3E, two strips of syntra light traps 26 are used to compensate the difference in size on the sides of the CB103 interface 10 (118.2 mm) and the outer dimension of the smaller side of the 4×5 connecting frame 15 (140 mm). Each of the light trap 26 measures 10.7 mm and are secured on each side of the CB103 interface 10 and on the connecting frame 15 with a bonding material such as cyanoacrylate and screws 24. Black RTV silicone seal is also used when light traps 26 are mounted on the connecting frame 15. FIG. 3F shows the completed CB 103 interface for a 4×5 format 20, herein after referred to as 4×5 adaptor 20, viewed from the side of the mounting frame 15. FIG. 4A shows the 4×5 adaptor 20 viewed from the side of the CB 103 interface 10, which is opposite of FIG. 3F. FIG. 4B shows the side view of the 4×5 adaptor 20 and the interconnection of the CB 103 interface 10 and connecting frame 15 and the position of the light trap 26. The distance between the lens and the film plane is increased; in this particular instance, increased by a total of approximately 36 mm from the original film plane due to the thickness/depth of the CB 103 interface 10 (25.45 mm) and the connecting frame 15 (10.4 mm).

The 4×5 adaptor 20 allows the temporary conversion of existing photographic systems which utilize CB103 film magazine 1 in the 3¼×4¼ format to the 4×5 format, by attaching the 4×5 adaptor 20 to the camera instead of a CB 103 film magazine rear door 4 as shown in FIG. 1D without permanently affecting the camera. FIGS. 5A and 5B illustrate an example of a Polaroid CU-5 camera 25 using a CB 103 film magazine 1 (FIG. 5A) and a similar Polaroid CU-5 camera 25 using the 4×5 adaptor 20 (FIG. 5B). Any 3¼×4¼ format cameras that accept CB103 film magazine 1 can be similarly converted to a 4×5 photographic system. Some photographic system may require adjustment to the focal length when the 4×5 adaptor 20 is used. A ground glass panel (not shown) may be mounted onto the connecting frame 15 of the 4×5 adaptor 20 for focusing when used for close up work. Infinity on cameras with the 4×5 adaptor 20, such as that shown in FIG. 5B, may be achieved with lenses having longer focal length. Conversion of the CB 103 interface 10 into different formats other than 4×5, such as 35 mm, 6 cm×9 cm, 5×7, can be similarly achieved with the steps discussed above.

Converting a 3¼×4¼ Camera into a 4×5 Camera with a 4×5 Adaptor

In the preferred embodiment of this invention, Polaroid 110 series cameras, in particular, Models 110/110A/110B/120/900/150/160/800, are chosen for conversion into 4×5 cameras because they have the basic necessary parts and an accurate turn knob focusing system. However, additional modification and improved tolerances of such a camera, to be discussed below, is necessary for a 4×5 format camera.

In comparison with the Polaroid CU-5 camera shown in FIG. 5B, the conversion of the Polaroid 110 series camera is permanent and the 4×5 adaptor 20 becomes an integral part of the final product.

The coupled rangefinder/parallax 4×5 camera of the present invention requires the following parts, which are considered to be available now, from existing Polaroid Models 110/110A/110B/120/900/150/160/800 cameras:

| Parts* | 110 | 110A | 110B | 120 | 900 | 150[3] |
|---|---|---|---|---|---|---|
| Focusing door 65 | X | X | X | X | | X |
| Focusing door hinges 54 | X | X | X | X | X[1] | X |
| Focusing train 55 | X | X | X | X | | X |
| Lens board 50 | X | X | X | X | | |
| Body shell with coupled rangefinder/parallax 28 | | | | X | | X |
| Original lens[2] | X | X | X | X | | |
| Cams 120 and coupling arms 115 | X | X | X | X | X | |

*Each of the parts from alternate Models listed in the table above are identical except for the focusing door hinges.
[1]It is preferable that focusing door hinges 54' from Model 900 is used because it offers play reduction adjustment, which improves performance of the final camera.
[2]Other optional lens, with appropriate washer may be used.
[3]The constructions of Models 160 and 800 are identical to Model 150 in all relevant aspects.

As shown in the table above, the only model with all the basic needed parts is Model 110B. However, Model 110B is scarce and costly to obtain and usually in poor condition. Therefore, the body of the amateur version of Model 110B, Model 900, which also has a coupled rangefinder/parallax assembly, is used, with the remaining parts replaced from other available models.

FIG. 6A shows the body shell 28 of a Model 900 camera in an opened position viewed from the front, exposing the inner panel 32 with a roller on the left of the front shell 34 and the back cover 36 on the right of the front shell 34. FIG. 6B shows the body shell 28 in a closed position, viewed from the bottom, showing the front shell 34 and the back cover 36. The body shell 28 is cut at two locations to accommodate the 4×5 adaptor 20, which replaces the old roll film back system. The first cut 30 is at an angle, on the left side of the front shell 34, at 27.5 mm from the right edge of the original film opening 38 on the back cover 36. The second cut 35 is a ninety degree cut, on the back cover, at 52 mm from the hinge end of the back cover 36. The two sections cut from the body shell 28, shown in cross-hatched in FIG. 6A, are discarded. The measurements for these two cuts is designed for the 4×5 adaptor 20, but may vary 1 cm in either direction depending on the size of the interface to be used between the body shell 28' and the 4×5 connecting frame 15. As mentioned in the section above for the 4×5 Adaptor Using CB 103 Interface, a 3¼×4¼ camera can also be converted into different formats other than 4×5, such as 35 mm, 6 cm×9 cm, 5×7, etc. and the two cuts 30 and 35 will be cut accordingly. Further, different sized bellows may be used to correspondingly accommodate a larger or smaller format that the camera is being converted to to provide sufficient image projection through the bellow to the film plane. The edges of the first and second cuts 30 and 35 are beveled and rubber edges 42 are installed for protection, shown in FIG. 8D.

Figure 6C:
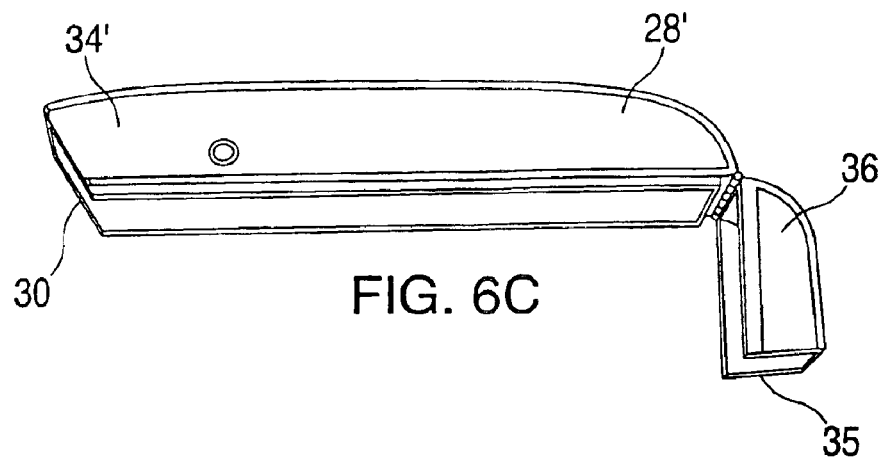
Figure 6D:
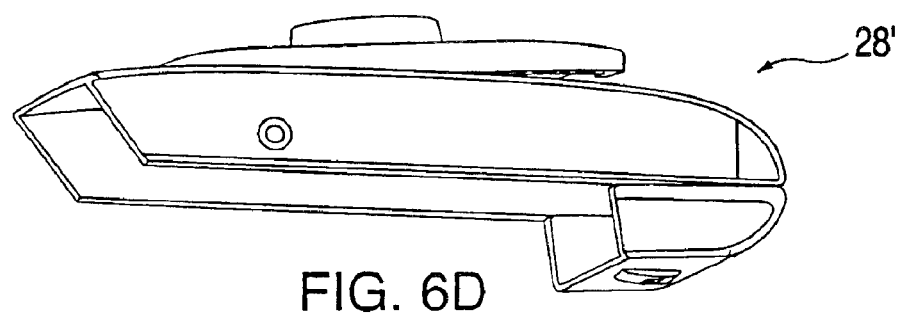
Figure 6E:
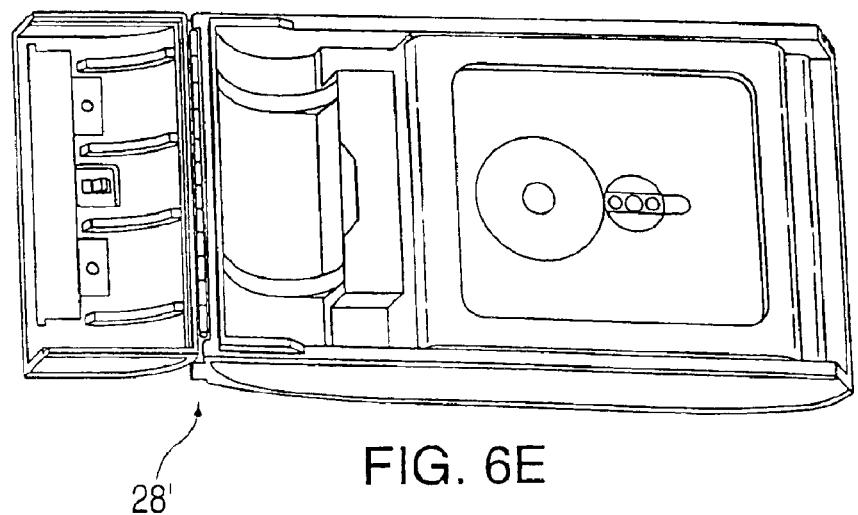

FIG. 6C shows the bottom view of the body shell 28' after the first and second cuts 30 and 35. As shown in FIG. 6C, protruding edges 44 are located along the top (not shown) and bottom edges of the front shell 34 where the back cover 36 originally seals to trap light. The protruding edges 44 must be milled so that the 4×5 adaptor 20 can be mounted flushed against the body shell 28 and ninety degree to the base of the lens board 50, to be described with FIGS. 12A–12J. FIG. 6D shows the body shell 28' without the protruding edges 44. FIG. 6E is the body shell 28' in the open position, view from the back.

Figure 7B:
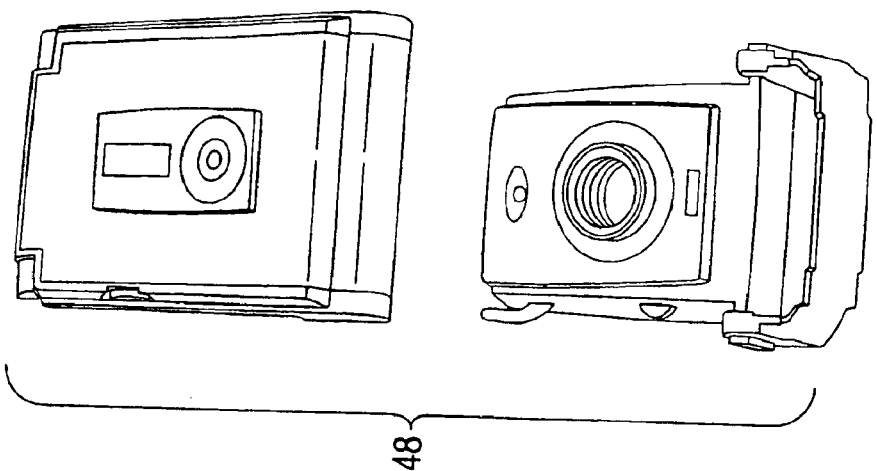
FIGS. 7A–7D show the modification of the focusing system of a Polaroid 900 camera for a coupled rangefinder/parallax 4×5 camera of the present invention.
Figure 7A:
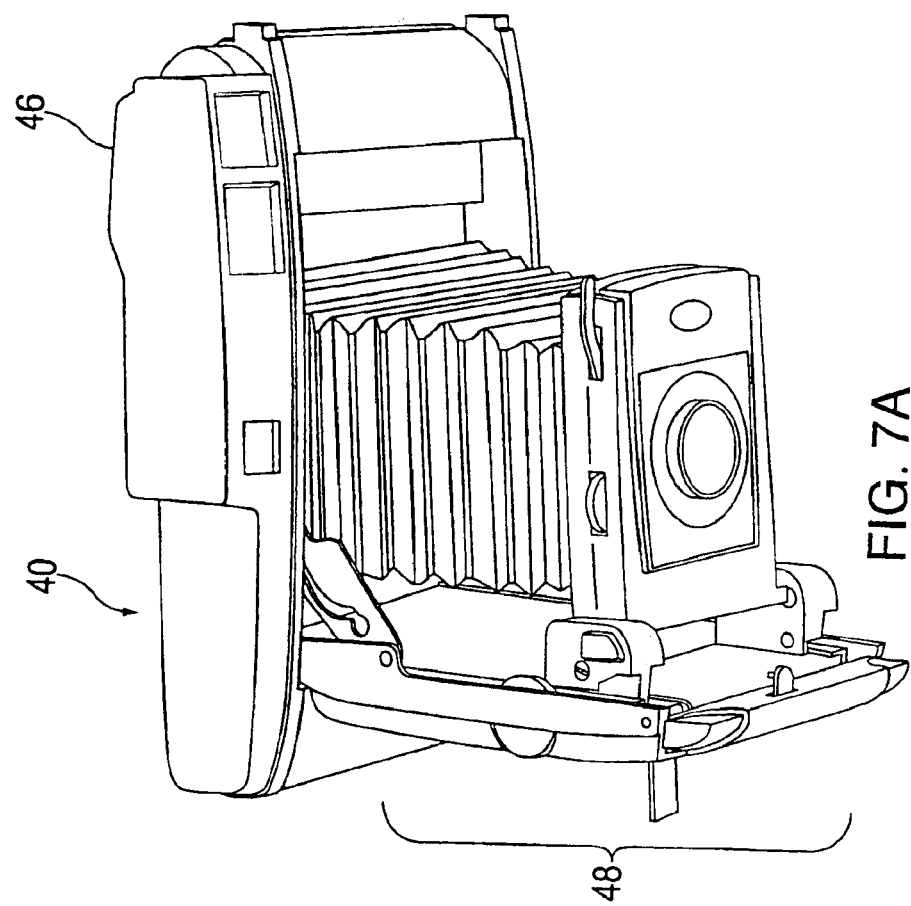
Figure 7D:
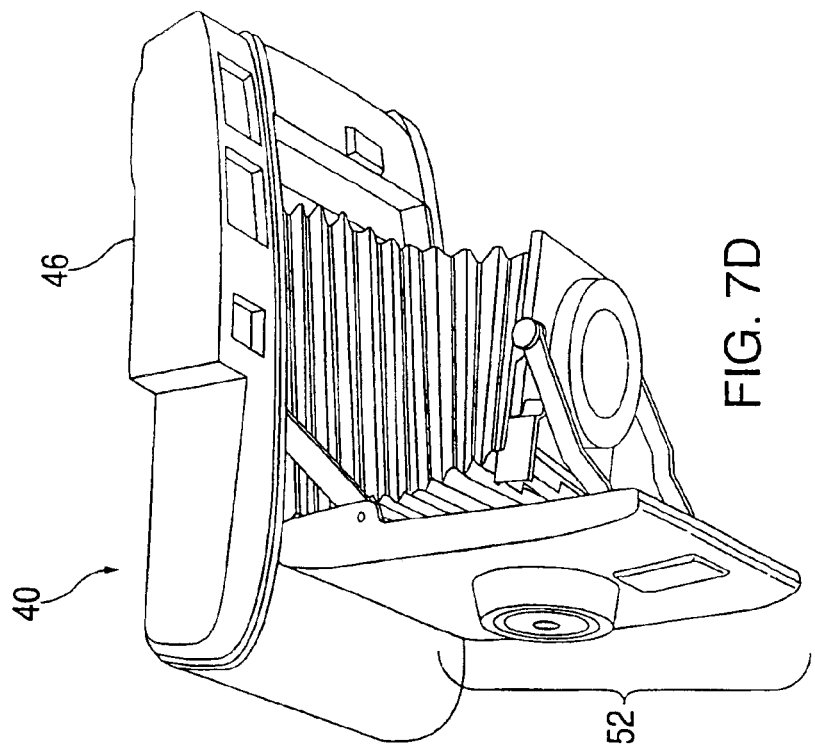
Figure 7C:
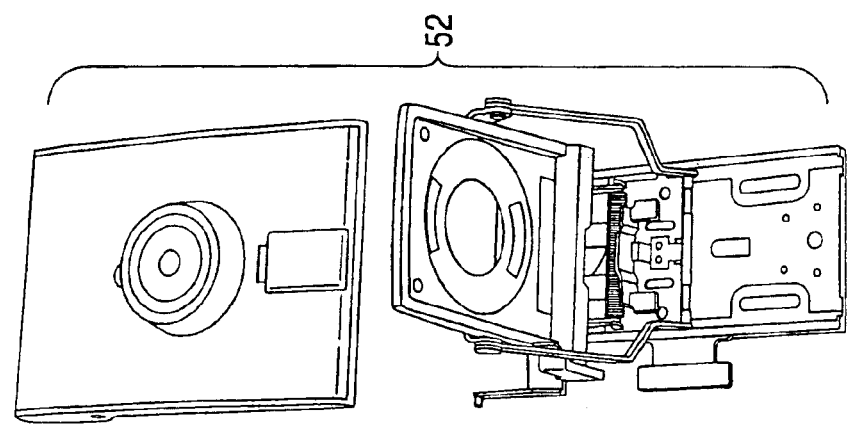

FIGS. 7A–7D show the modification of the focusing system 48 of a Polaroid 900 camera 40 for a coupled rangefinder/parallax 4×5 camera. FIG. 7A shows a Polaroid Model 900 camera 40 with a coupled rangefinder/parallax assembly 46. FIG. 7B shows the focusing system 48 of the Model 900 camera 40 removed, which is replaced by the focusing system 52 from a Polaroid Model 110 series camera (shown in FIG. 7C). FIG. 7D shows the Model 900 camera 40 with the focusing system 52 re-hinged onto the camera 40, which description will follow.

Figure 8A:
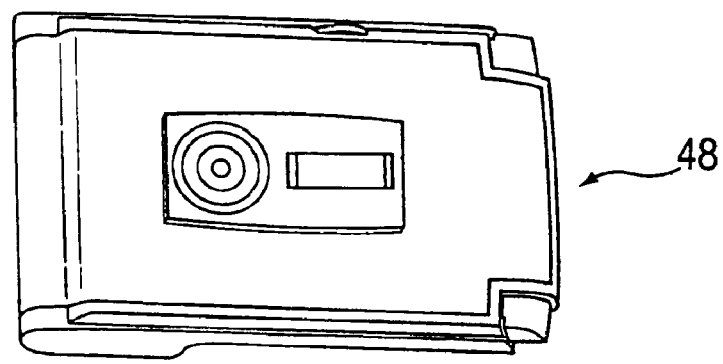
FIGS. 8A–8E show the steps of modifying the focusing system of a Polaroid 900 camera for a coupled rangefinder/parallax 4×5 camera of the present invention.
Figure 8B:
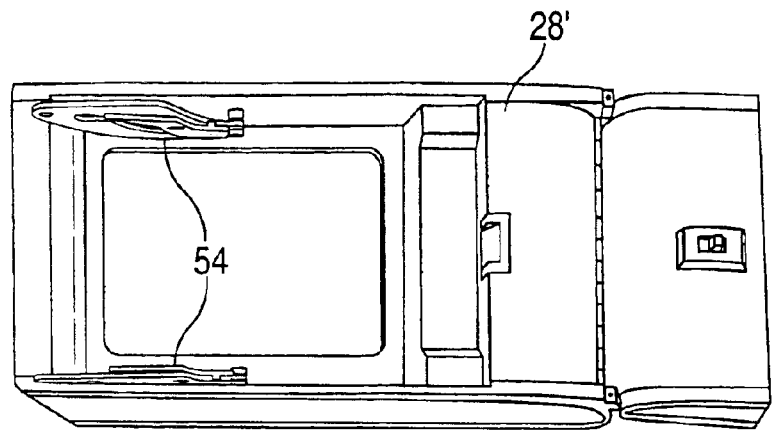
Figure 8C:
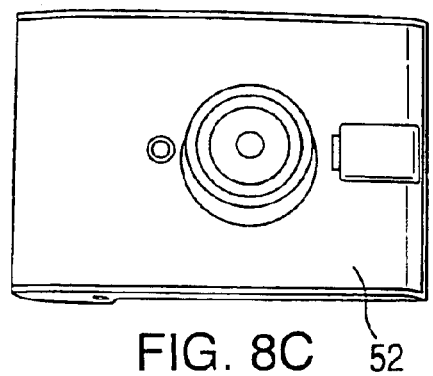
Figure 8D:
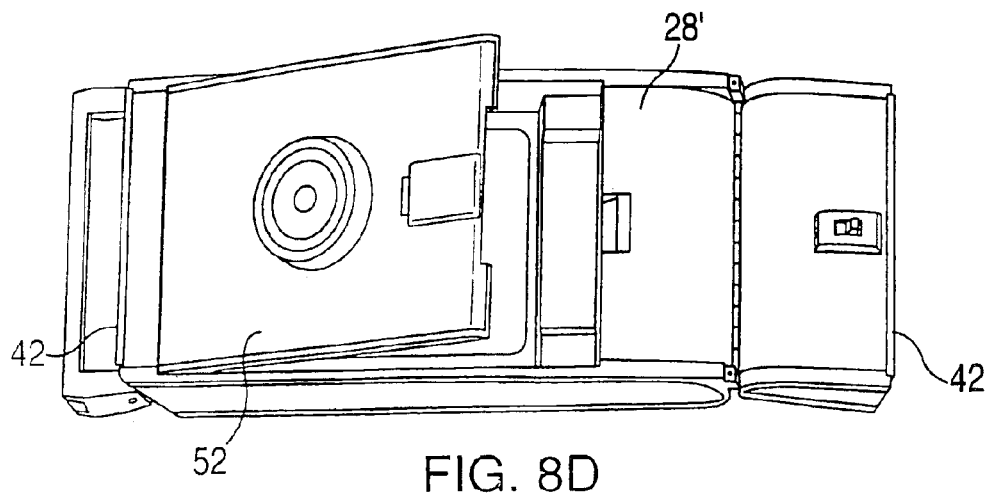
Figure 8E:
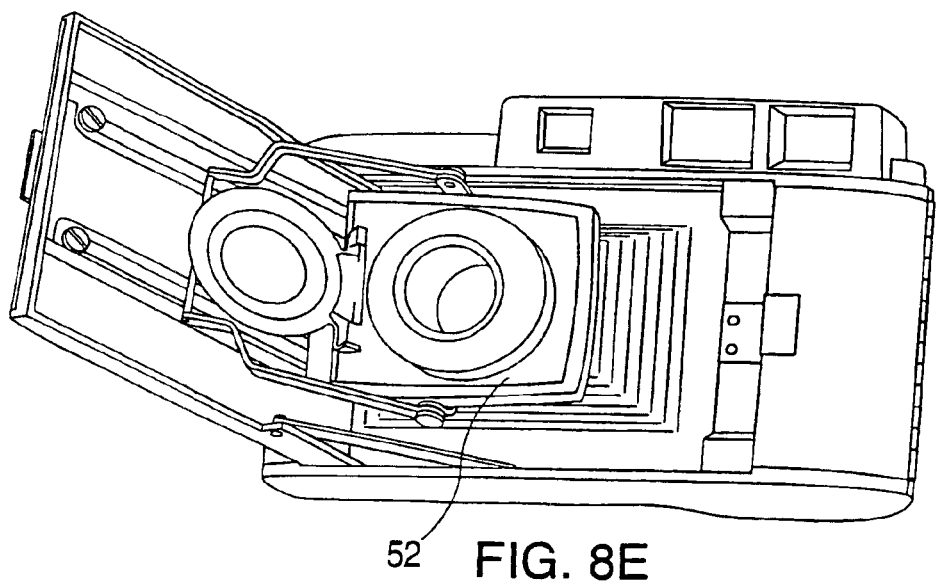

FIG. 8B shows the body shell 28' with the focusing system 48 (FIG. 8A) of a Polaroid 900 camera 40 removed. A pair of focusing door hinges 54 are installed onto the body shell 28'. The focusing system 52 from a Polaroid Model 110 series camera (shown in FIG. 8C) is re-hinged onto the body shell 28' and the focusing door hinges 54, as shown in FIGS. 8D and 8E.

Figure 9A:
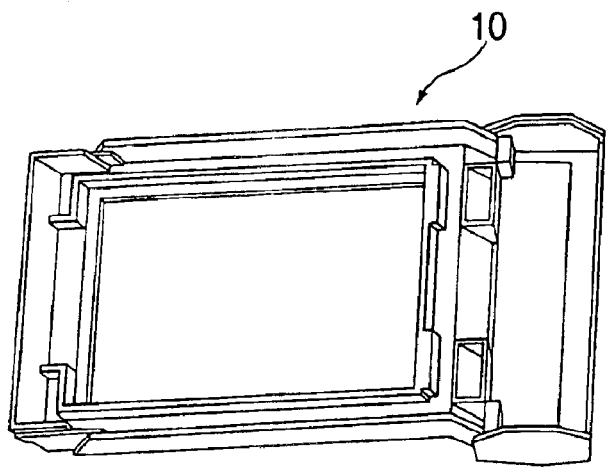
FIGS. 9A–9E show the steps of permanently mounting a 4×5 adaptor to a Polaroid body shell by first installing the bottom half of the CB 103 interface and then mounting to it the 4×5 adaptor for a coupled rangefinder/parallax 4×5 camera of the present invention.
Figure 9B:
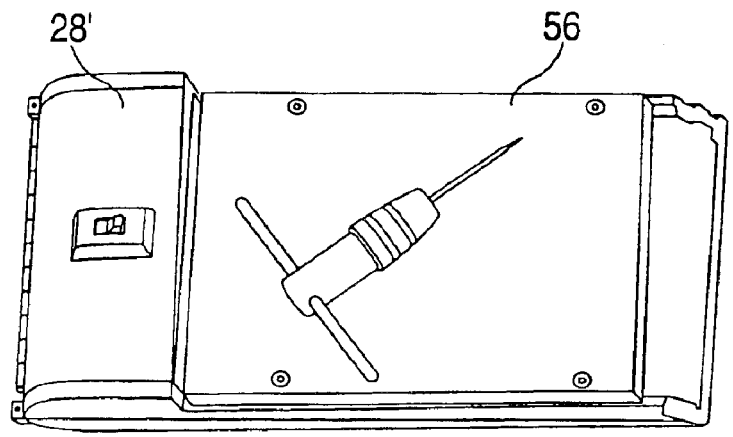
Figure 9C:
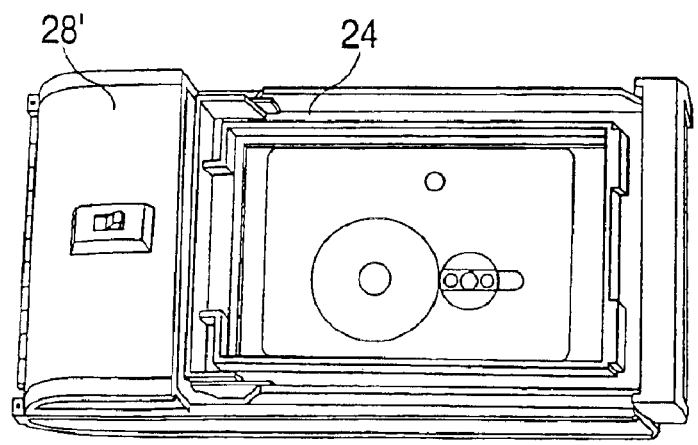
Figure 9D:
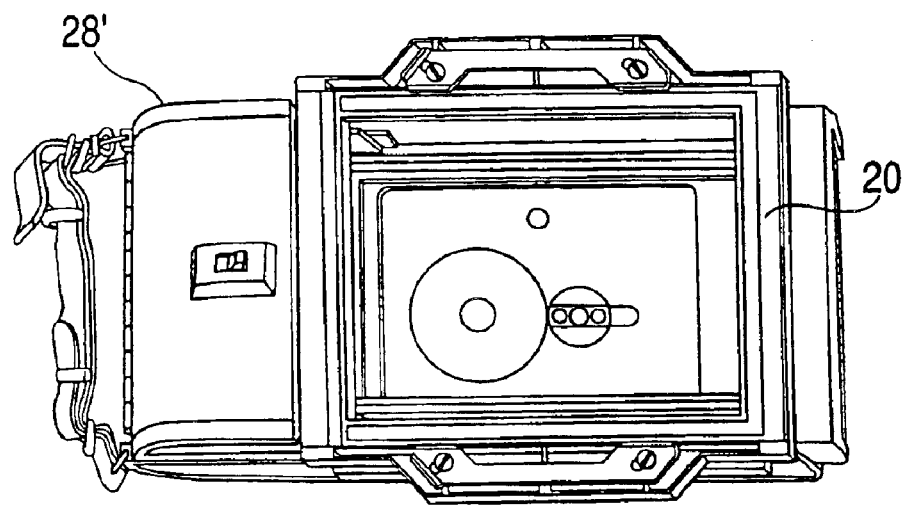
Figure 9E:
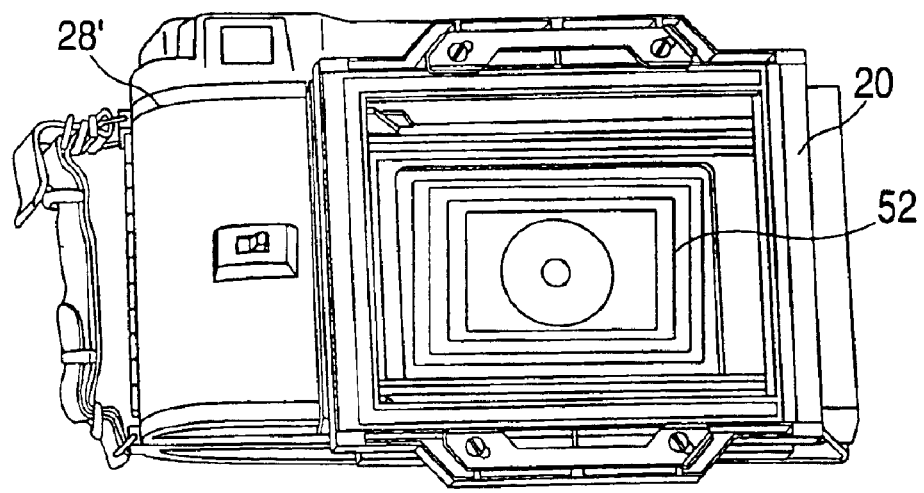
Figure 10:
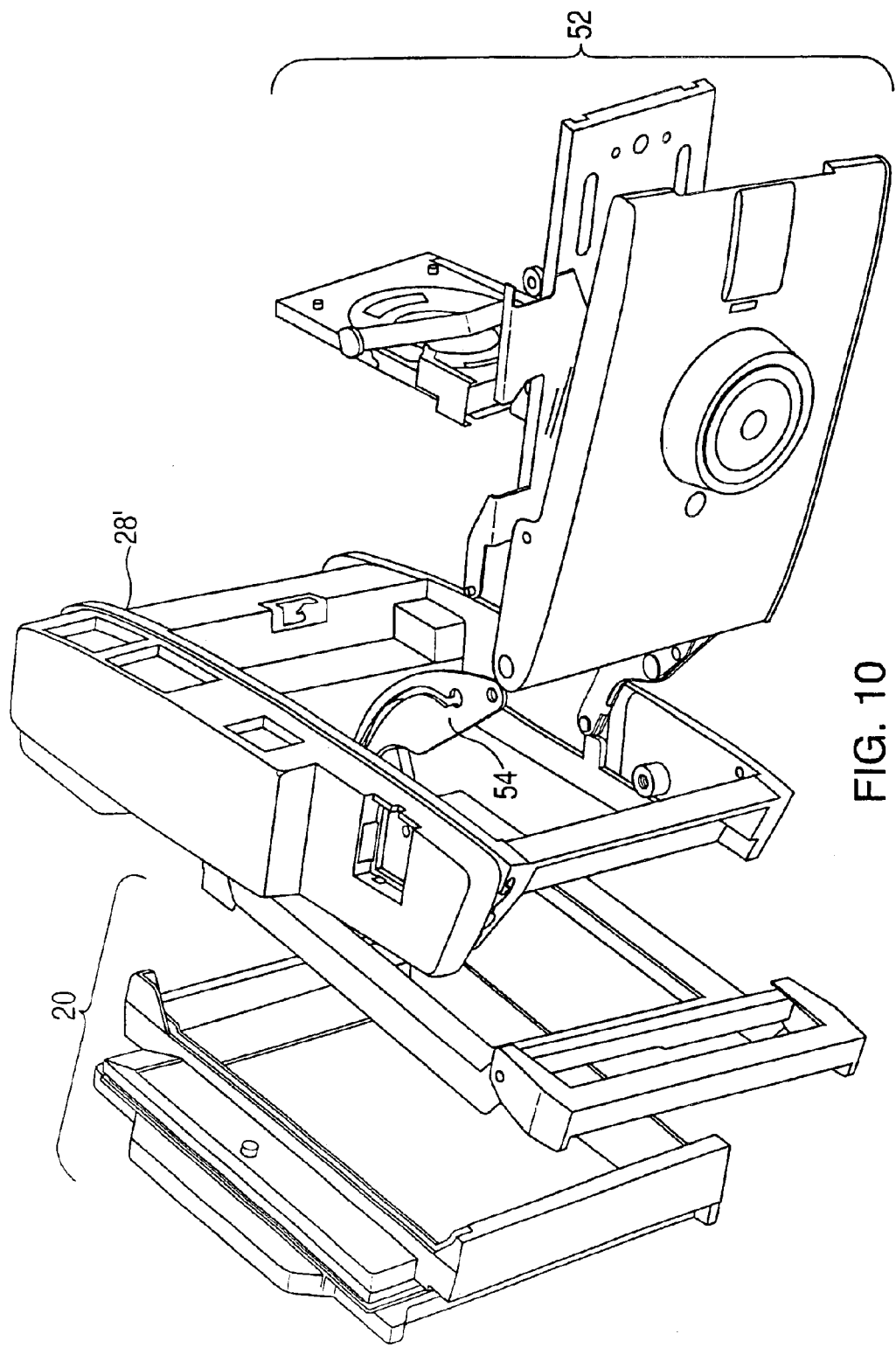
FIG. 10 shows the different components for the coupled rangefinder/parallax 4×5 camera of the present invention.

FIG. 9A shows the CB 103 interface 10 for permanently installing onto body shell 28'. FIG. 9B shows that a template 56 is used to drill a plurality of holes through the body shell 28'. Each hole is tapped and the CB 103 interface 10 is secured to the body shell 28' with screws 24, as shown in FIG. 9C and black RTV silicone seal is used between the body shell 28' and the CB 103 interface 10 to trap light. The 4×5 adaptor 20 modified from the CB 103 interface 10 for the 4×5 format as described in connection with FIGS. 3A–3F above, is then mounted onto the body shell 28', as shown in FIG. 9D, without the focusing system 52. FIG. 9E shows the coupled rangefinder/parallax 4×5 camera 45 of the present invention, with the focusing system 52 installed, which is to be described in connection with FIGS. 12A–12J. FIG. 10 shows a different view of the different components for the coupled rangefinder/parallax 4×5 camera 45.

Figure 11B:
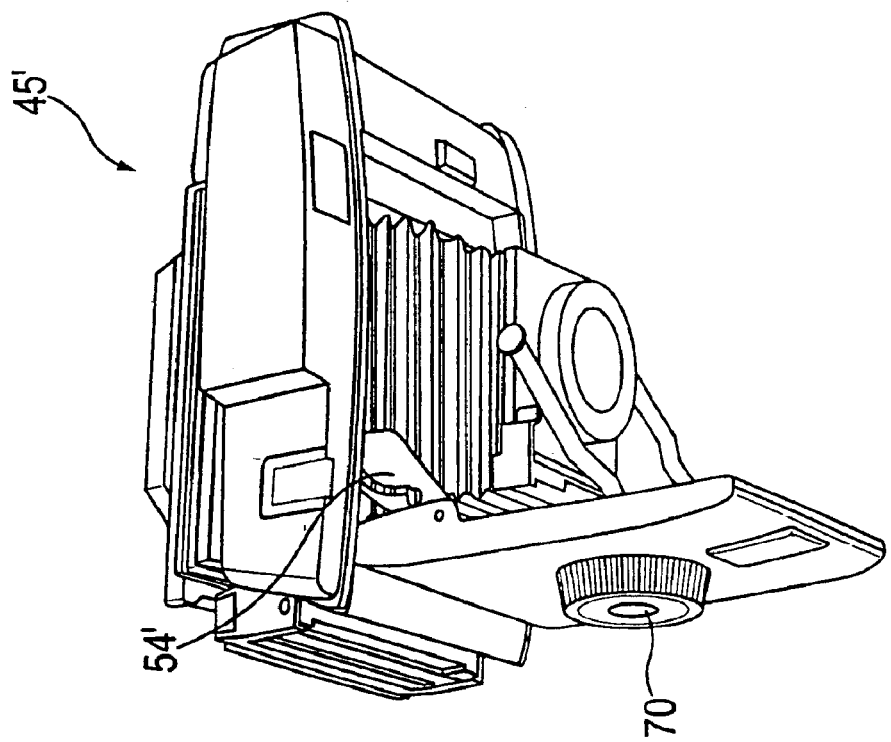
FIGS. 11A and 11B show two different combinations of the coupled rangefinder/parallax 4×5 cameras of the present invention, utilizing different components.
Figure 11A:
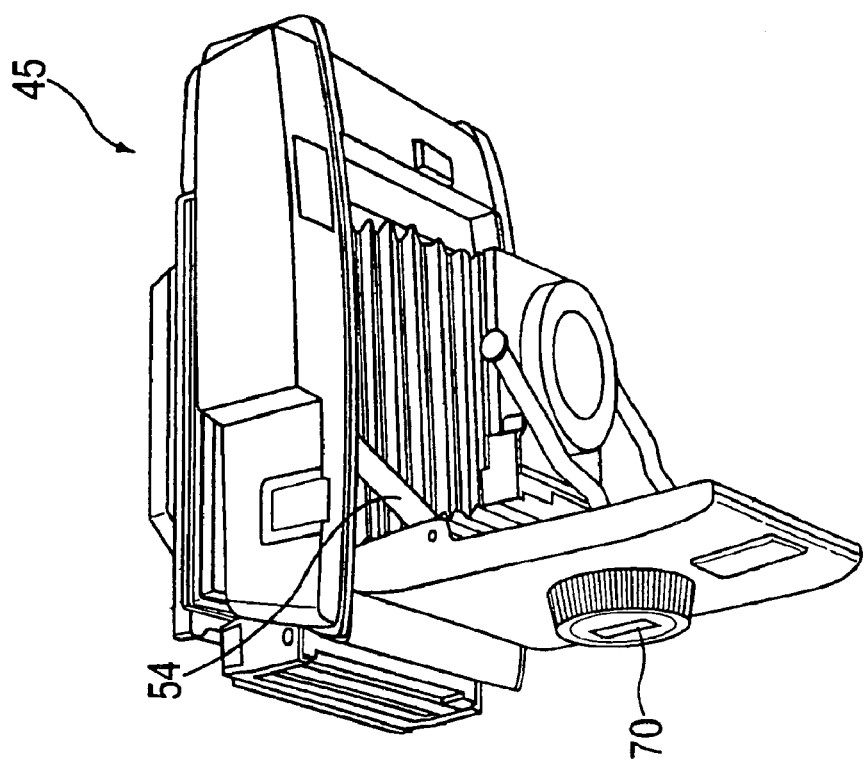

FIG. 11A is a coupled rangefinder/parallax 4×5 camera 45 using all the components from a Model 110B camera. FIG. 11B is a coupled rangefinder/parallax 4×5 camera 45' using a body shell 28' from a Model 900 camera with components from other Model 110 series cameras. The difference between the cameras 45 and 45' are the focusing door hinges 54 and 54'. As discussed above, focusing door hinges 54' of the Model 900 camera provides play reduction adjustment.

Figure 12C:
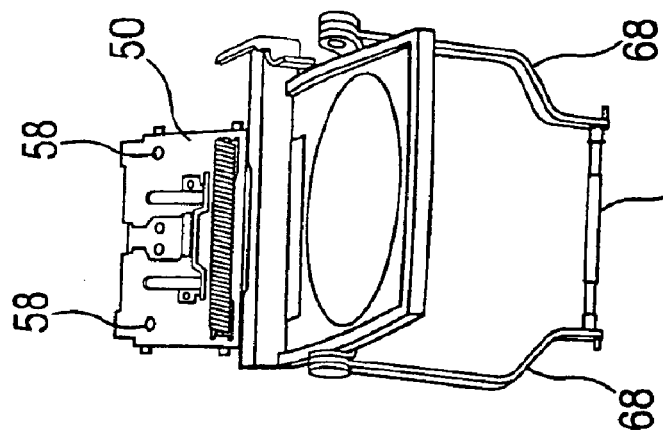
FIGS. 12C–J show the steps of modifying the focusing system of the coupled rangefinder/parallax 4×5 cameras of the present invention
Figure 12D:
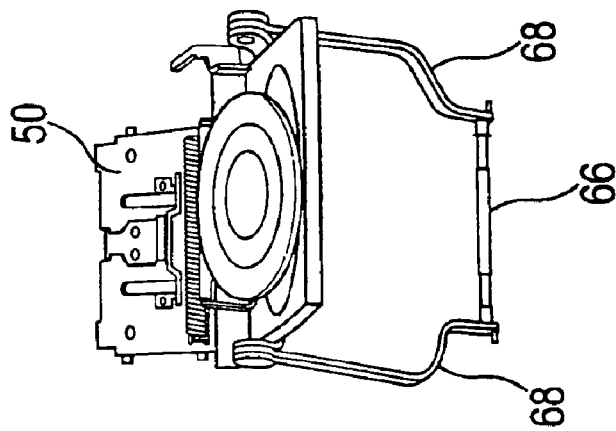
Figure 12E:
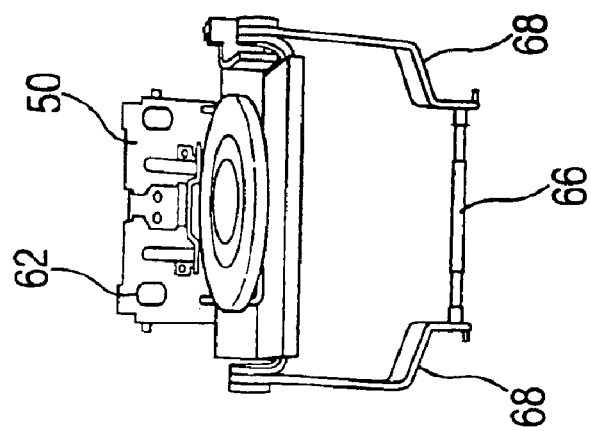
Figure 12F:
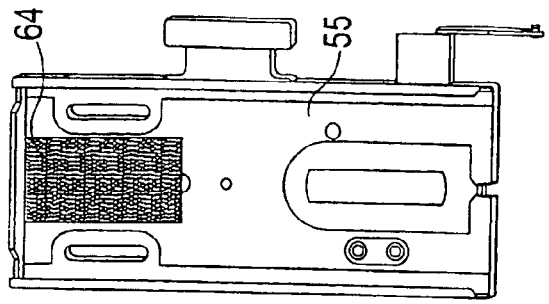
Figure 12G:
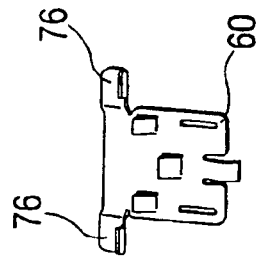
Figure 12H:
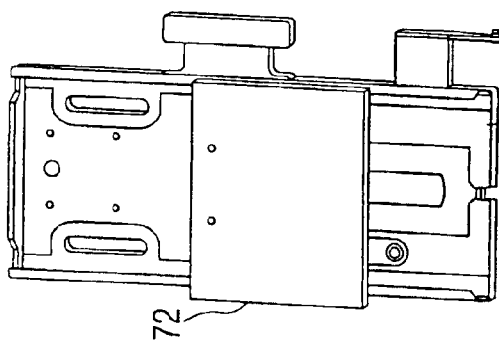
Figure 12I:
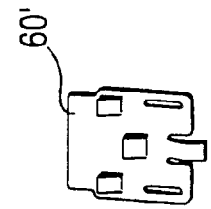
Figure 12J:
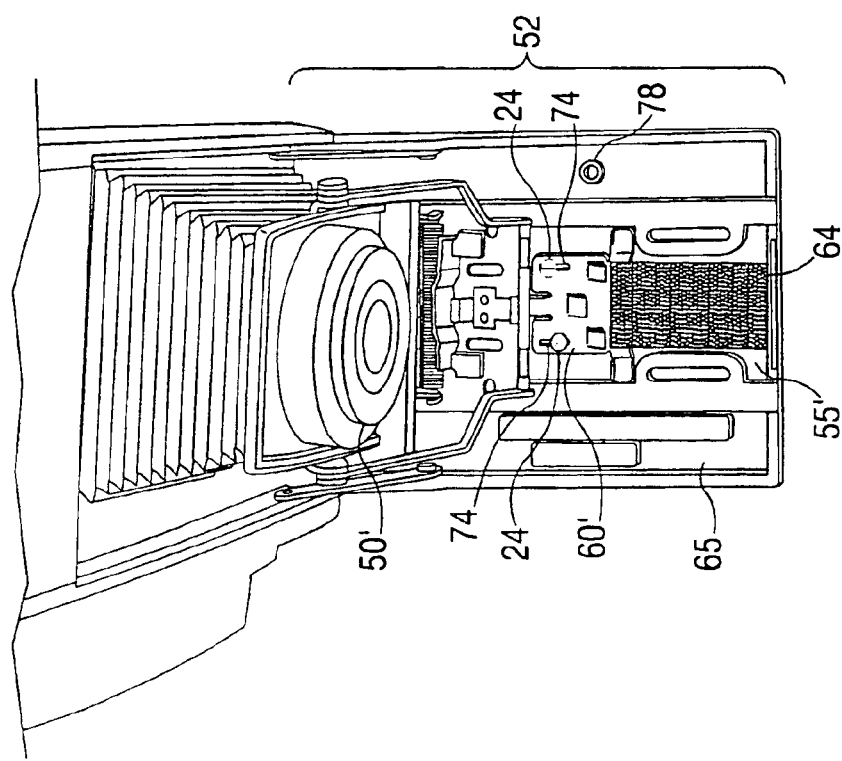
Figure 13:
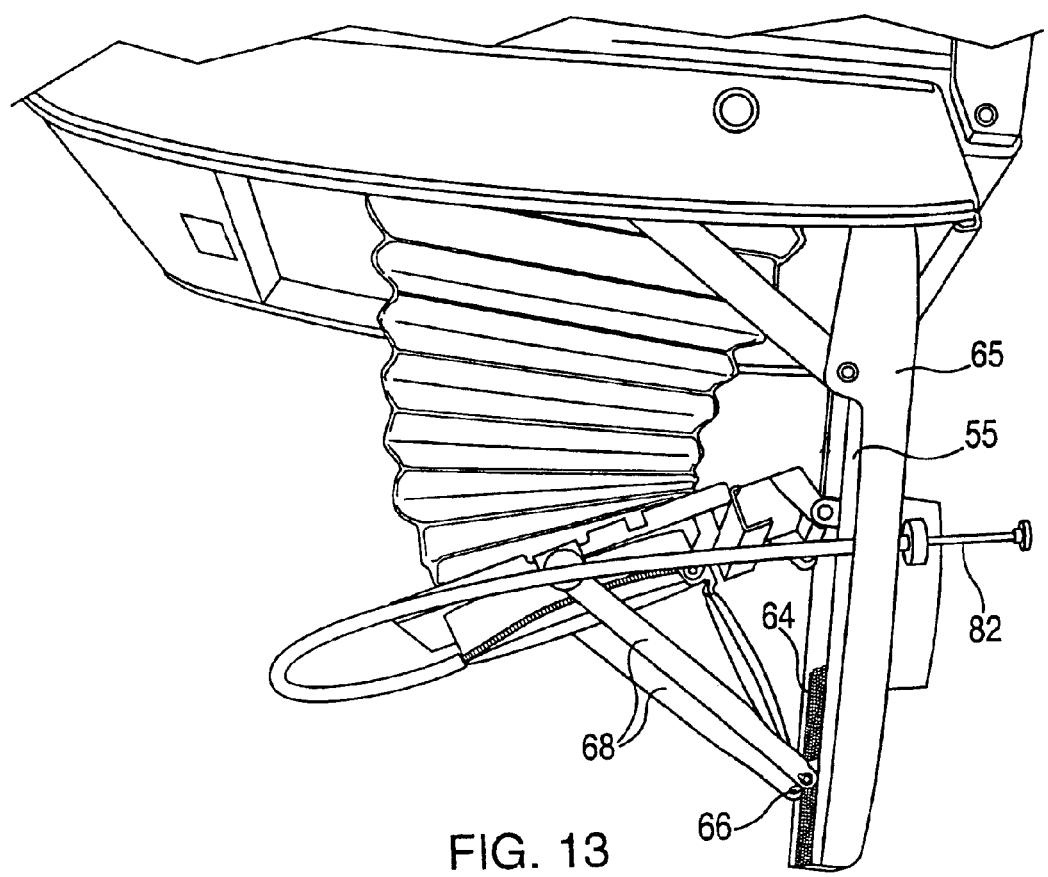
FIG. 13 shows the additional features of a front tilt and a cable release port for the coupled rangefinder/parallax 4×5 cameras of the present invention.

FIGS. 12A–12B show the original focusing system 48 before modification, with unmodified lens board 50, focusing train 55 and original infinity locking plate 60 in its original position. FIG. 12B shows the position of the lens board 50 at infinity, with the lens board 50 latched onto the infinity locking plate 60. The focusing train 55 is slidably connected to the focusing door 65 and is controlled via a focusing knob 70. FIG. 12C shows the lens board 50 with the base having two round holes 58, each measuring ⅛ inch in diameter. The holes 58 must be enlarged to 7/32 inch in diameter, by drilling with a #12 drill bit, as shown in FIG. 12D. The enlarged holes 58 are then tapped with a ¼ inch 20 nc taps 62, as shown in FIG. 12E. FIG. 12F shows the focusing train 55 with the infinity locking plate 60 removed (as shown in FIG. 12G) with a piece of Velcro strip 64 applied to the front of the focusing train 55. Velcro strip 64 acts as a tilt bed providing upward friction to support the front bar 66 that joins the lens board arms 68 when the tilt feature is activated (as shown in FIG. 13). Strip 64 of a material different than Velcro that provides frictional resistance may be used. FIG. 12H shows that a template 72 is used for drilling new holes 74 on the focusing train 55 for the repositioning of the modified infinity locking plate 60'. The modified infinity locking plate 60' (as shown in FIG. 12I) requires the removal of the two opposite tips 76 from the original infinity locking plate 60 (as shown in FIG. 12G) that extend outwardly to allow the lens board 50' to extend beyond the modified locking plate 60' in order for the focusing door 65 to close when closing the camera 45. The modified infinity locking plate 60' is then secured onto the focusing train 55 with a bonding material such as cyanoacrylate and screws 24, as shown in FIG. 12J. With the lens board 50' locked at the new infinity position, as shown in FIG. 12J, the set screws 24 are tightened until they match the holes 74 on the lens board 50' to prevent unwanted swinging and to ensure that the base of the lens board 50' remaining ninety degree to the film plane. The bellows that connects the camera body to the lens board 50' is of sufficient length to accommodate the full range of motion along the focusing train 55.

FIG. 13 shows two new features, the tilt feature and the cable release port, of the coupled parallax 4×5 rangefinder camera 45 of the present invention. As discussed above, the tilt feature is accomplished by providing a Velcro strip 64 on the focusing train 55, which allows the front bar 66 connected to the lens board arms 68 to be frictionally held in a forward tilt position. A cable release port 78 (shown in FIG. 12J) on the focusing door 55 is provided for a cable release 82.

Figure 14A:
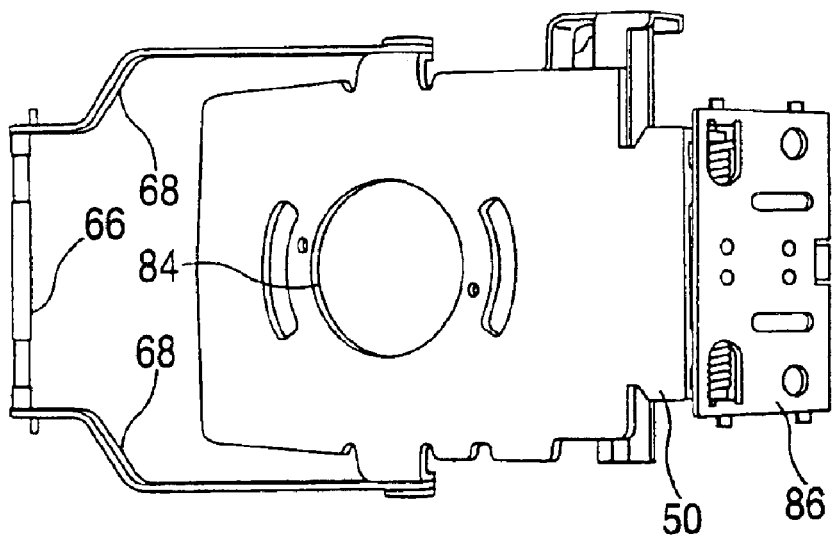
FIGS. 14A–14F shows the additional feature of providing a different shutter size and allowing close up work for the coupled rangefinder/parallax 4×5 cameras of the present invention.
Figure 14B:
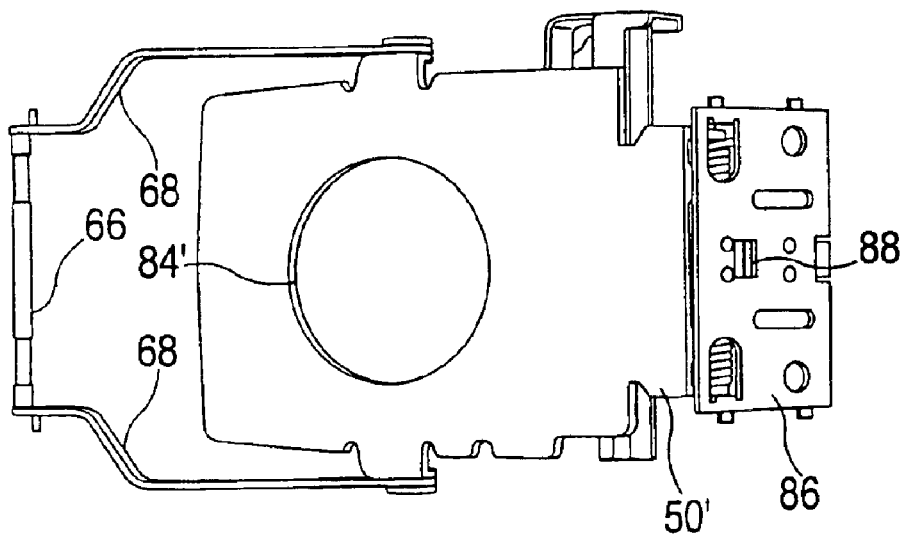
Figure 14C:
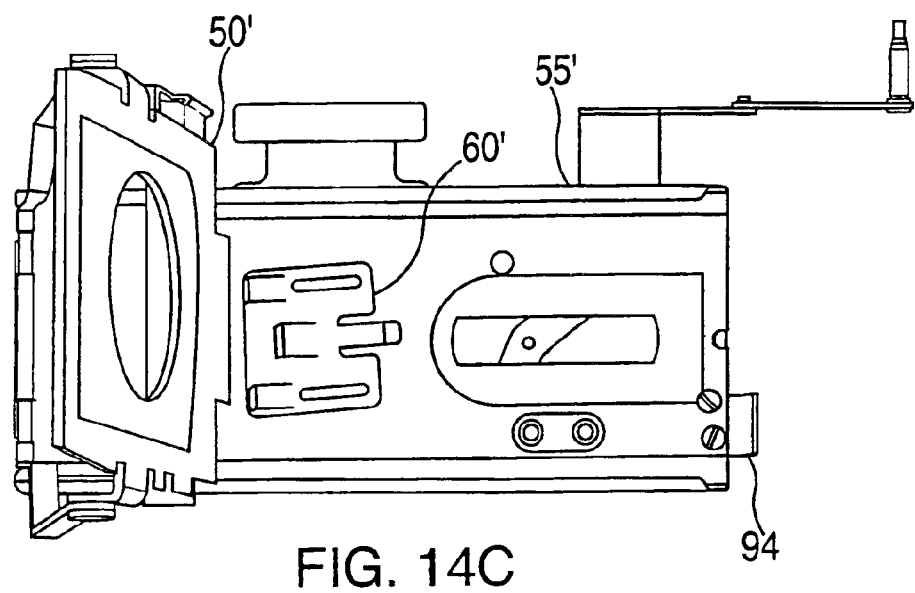
Figure 14D:
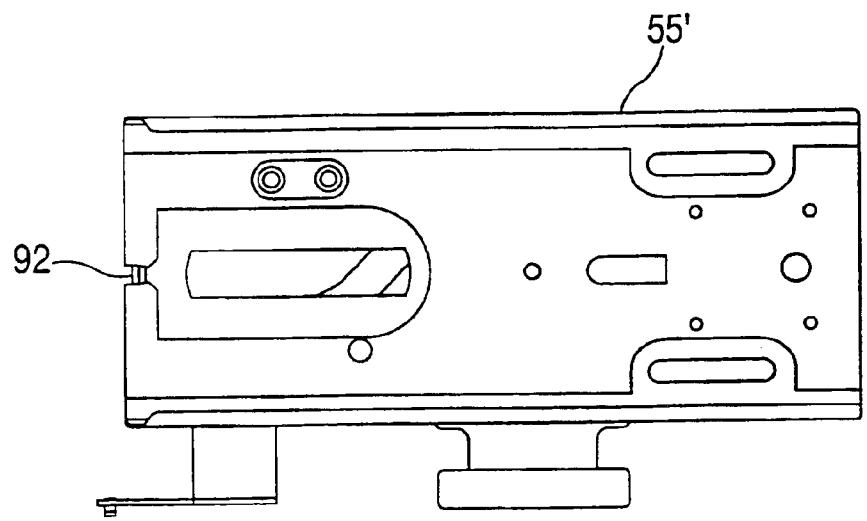
Figure 14E:
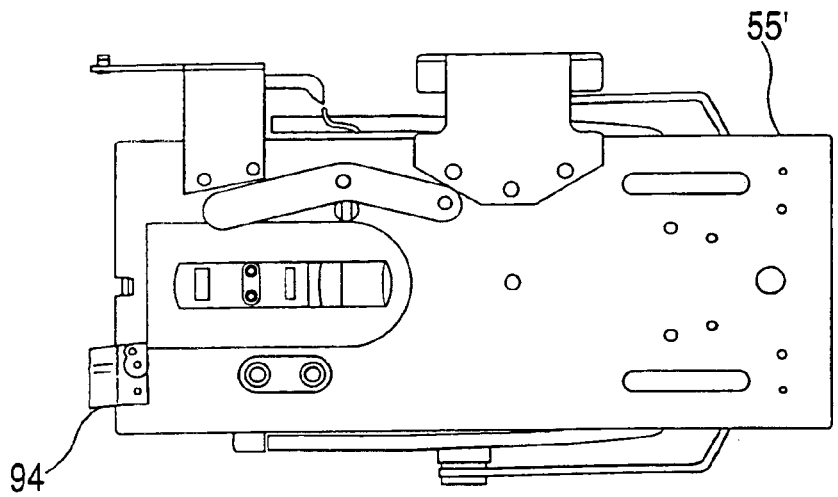
Figure 14F:
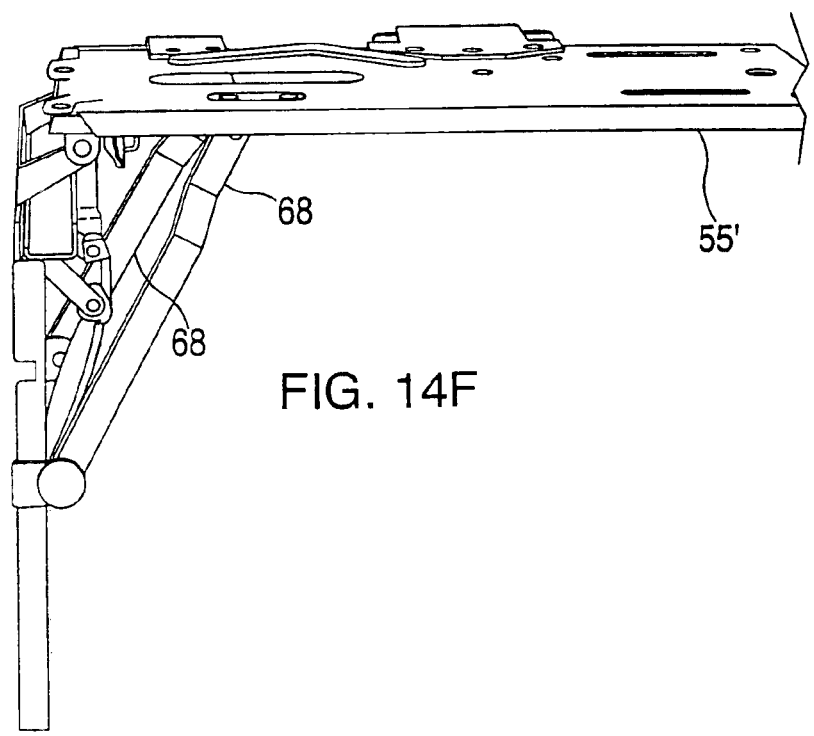

As shown in FIG. 14A, the original shutter opening 84 on the original lens board 50 is for a #0 shutter. The shutter opening 84 is milled and enlarged for a #1 shutter opening 84', as shown in FIG. 14B. The shutter opening 84 may be milled to different sizes to accommodate different optional lens and their respective washers. The center stop 88 at the base 86 of the lens board 50 (as shown in FIG. 14B) is eliminated (as shown in FIG. 14A) to allow the lens board 50' to move beyond the repositioned and modified infinity locking plate 60' on the focusing train 55' to allow close up capabilities as an optional feature (as shown in FIG. 14C). A second center stop 92 (as shown in FIG. 14D) on the focusing train 55' cooperates with the center stop 88 at the base 86 of the lens board 50' to prevent the lens board 50' from falling off when it is receded to close the camera. Because the center stop 88 is eliminated, the center stop 92 is not necessary and is also eliminated by flattening it, as shown in FIG. 14C. A replacement stop 94 is added at the end of the focusing train 55' to prevent the lens board 50' from falling off the focusing train 55', as shown in FIGS. 14C (top view) and 14E (bottom view). The replacement stop 94 may be added to either side at the end of the focusing train 55'. Furthermore, the replacement stop 94 may be a 4/40 or 5/40 socket head screw instead of the ledge shown in FIGS. 14C and 14E. FIG. 14F shows the connection of the lens board arms 68 to the focusing train 55'.

Adjustments/Refinements to the Coupled Rangefinder/Parallax 4×5 Camera

The coupled rangefinder/parallax 4×5 camera 45 of the present invention requires additional adjustments or refinements to improve the tolerances for the 4×5 format. Larger film format has less depth of field, i.e. can only focus within a smaller range, and more resolution, i.e. sharpness of image. A 4×5 format has a depth of field within inches with lens wide open; whereas, 35 mm format is capable of focusing on two items more than a few feet apart with the lens wide open. Due to the decrease depth of field and increased resolution, a more precise and accurate focusing system is necessary because slight vibration or movement can de-focus the image or de-calibrate the focusing system. Additionally, due to the age of the cameras, all rangefinder optical parts must be cleaned thoroughly, such as with acetic acid based dilutions, and lubricated with oil to prevent further micro-oxidation of gunmetal parts.

FIG. 15 shows an improved coupled rangefinder/parallax 90. The primary mirror 96, i.e. look through mirror, is permanently fixed to the rangefinder frame 98 with black or clear RTV silicone to avoid de-calibration by impact. Model 110A/110B/120/900/150 cameras come with a 127 mm lens and when the camera is modified to become a 4×5 format, only ninety percent (90%) of the image area captures by the film is covered by the original parallax. The original parallax utilizes a single transparent polycarbonate loupe 102 that is flat on one side and has a 7.5× power on the other. To increase the coverage of the parallax to one hundred percent (100%), a second loupe 104 with 7.5× power is stacked on top of the original loupe 102 to create a final loupe that provides a 15× power. The second loupe 104 may have different power to provide accurate coverage for different focal length. Alternatively, a new single loupe with the appropriate total power may be used to replace the original and second loupes 102 and 104. Alternatively, a lens having a concave surface and an opposite convex surface (not shown) may be mounted in front of the rangefinder frame 98 with the concave surface adjacent the rangefinder frame 98 to provide proper coverage of the parallax.

Figure 16D:
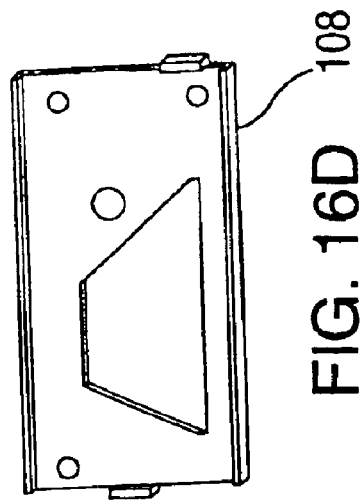
Figure 16F:
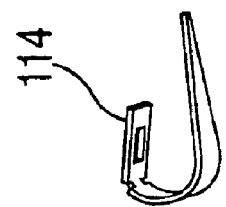
Figure 16C:
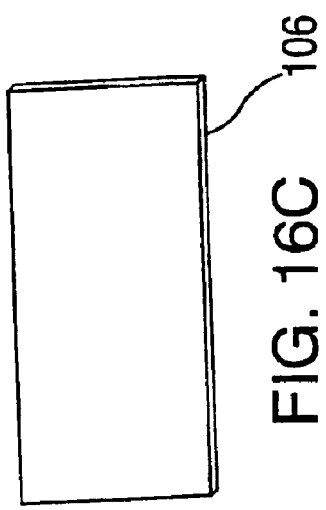
Figure 16E:
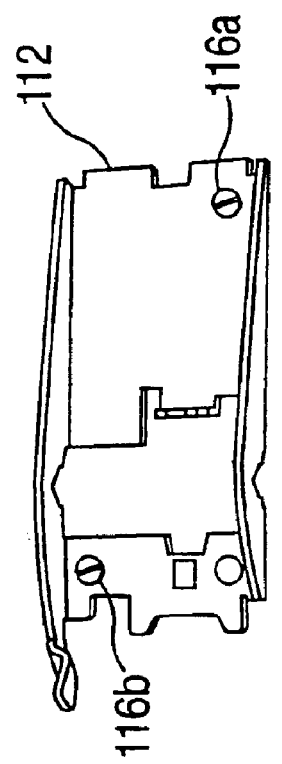
Figure 16H:
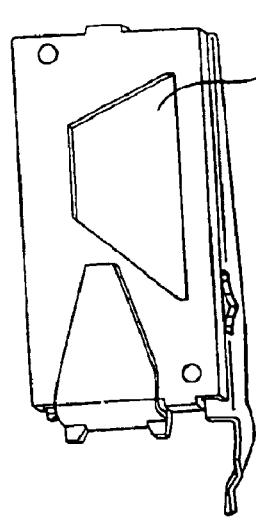
Figure 16G:
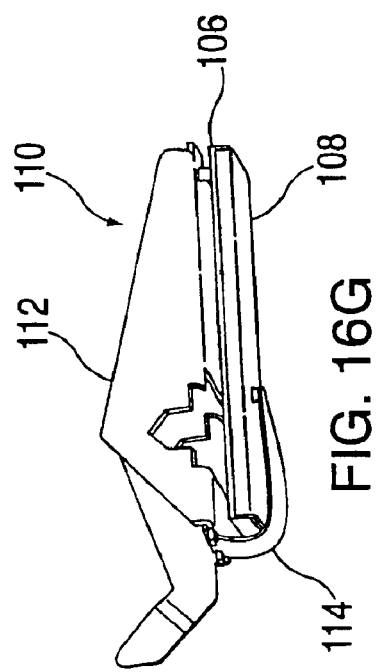

FIG. 16A shows the secondary mirror assembly 110, with a secondary mirror 106, i.e. pivoting mirror (see also FIG. 16C), retained in a mirror frame 108 (see also FIG. 16D) that is held against a pivoting mirror chassis 112 (see also FIG. 16E) by a steel clamp spring 114 (see also FIG. 16F) and two calibration screws 116A and 116B (see also FIG. 16E). FIGS. 16G and 16H show different views of the secondary mirror assembly 110 of FIG. 16A. The two calibration screws 116A and 116B are at diagonally opposed positions; one for vertical calibration and the other for horizontal calibration. The tolerance of the secondary mirror assembly 110 is improved by providing a third calibration screw 116C, as shown in FIG. 16B, to the horizontal calibration to prevent de-calibration by impact and to improve reliability of focus, which is essential in a 4×5 camera. Once calibration of the pivoting mirror assembly 110 is accomplished and the rangefinder is verified to be accurate, the third calibration screw 116C is then secured with a bonding material such as cyanoacrylate.

Figure 17B:
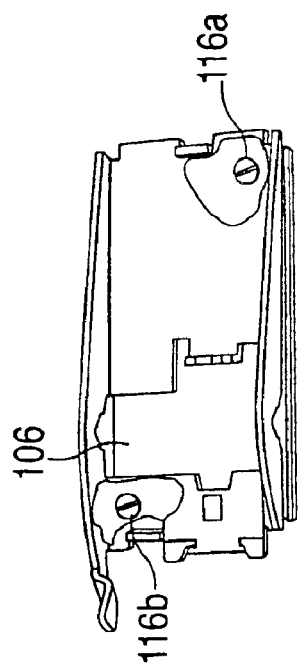
FIGS. 17A–17B show an alternate improvement made to the secondary pivoting mirror assembly.
Figure 17A:
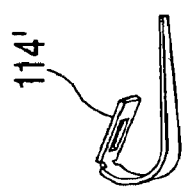

An alternative improvement of the secondary mirror assembly 110 is shown in FIGS. 17A–17B. The clamp spring 114 compresses and holds the secondary mirror assembly 110 together to maintain the calibrations of the secondary mirror 106 to accurately align both axes of the vertical and horizontal beams to allow the two images in the rangefinder to superimpose when the camera is in focus. Due to the age of the camera, the steel clamp spring 114 as shown in FIG. 16F lost part of its tensile strength and does not provide accurate tension. Furthermore, not enough tension is provided in the horizontal calibration while excessive tension is provided in the vertical calibration because of the off-centered position of the clamp spring 114, as shown in FIG. 16H. In order to raise the tension of the horizontal calibration to withstand the use and application for a 4×5 camera 45 of the present invention, additional tension is provided to the clamp spring 114 by bending it, as shown in FIG. 17A. However, the increased tension to the horizontal calibration 116B further increases the tension to the vertical calibration, which fails to stay true because the calibration screw 116A for the vertical calibration cannot withstand the increase pressured to maintain its calibration. In order to maintain both the vertical and horizontal calibrations, a quick setting bonding material is used after calibrations. A fast cured bonding material that may be used is cyanoacrylate with the use of an accelerator that speeds the curing period from twenty-four (24) hours to within seconds. The cyanocrylate material is also harder and stronger with the use of the accelerator because the fast curing period avoids the normal shrink and transformation due to the varying humidity during the extended curing period. The quick setting bonding material is preferably used on both calibration screws 116A and 116B and extend to the walls on the pivoting mirror chassis 112, as shown in FIG. 17B, to prevent the calibration screws 116A and 116B from de-calibrating.

The coupling focusing arm 115, as shown in FIG. 18, has two moving sections 118 joined by a rivet 122 that acts as an elbow joint. One of the moving section 118 is connected to the focusing train 55', the other moving section 118 is connected to the pivoting cam (not shown), to be described with FIG. 19. The rivet 122 of the original coupling focusing arm 115 produces displacements/play in the range of $12000^{th}$ to $20000^{th}$ of an inch movement, which is a catastrophic movement for a 4×5 format, resulting in inaccurate focus because the rangefinder would not react correspondingly to the displacement of the lens. Therefore, a new rivet 122' made of a harder material is necessary to minimize unwanted displacements or distortion such that true correspondence exists between what is seen through the viewfinder and what the lens captures. Thereby, the reliability of the coupled rangefinder/parallax 4×5 camera of the present invention is increased. In the alternative, the original rivet 122 may be crimped to expand its diameter to minimize the displacements and improve its reliability.

Figure 19:
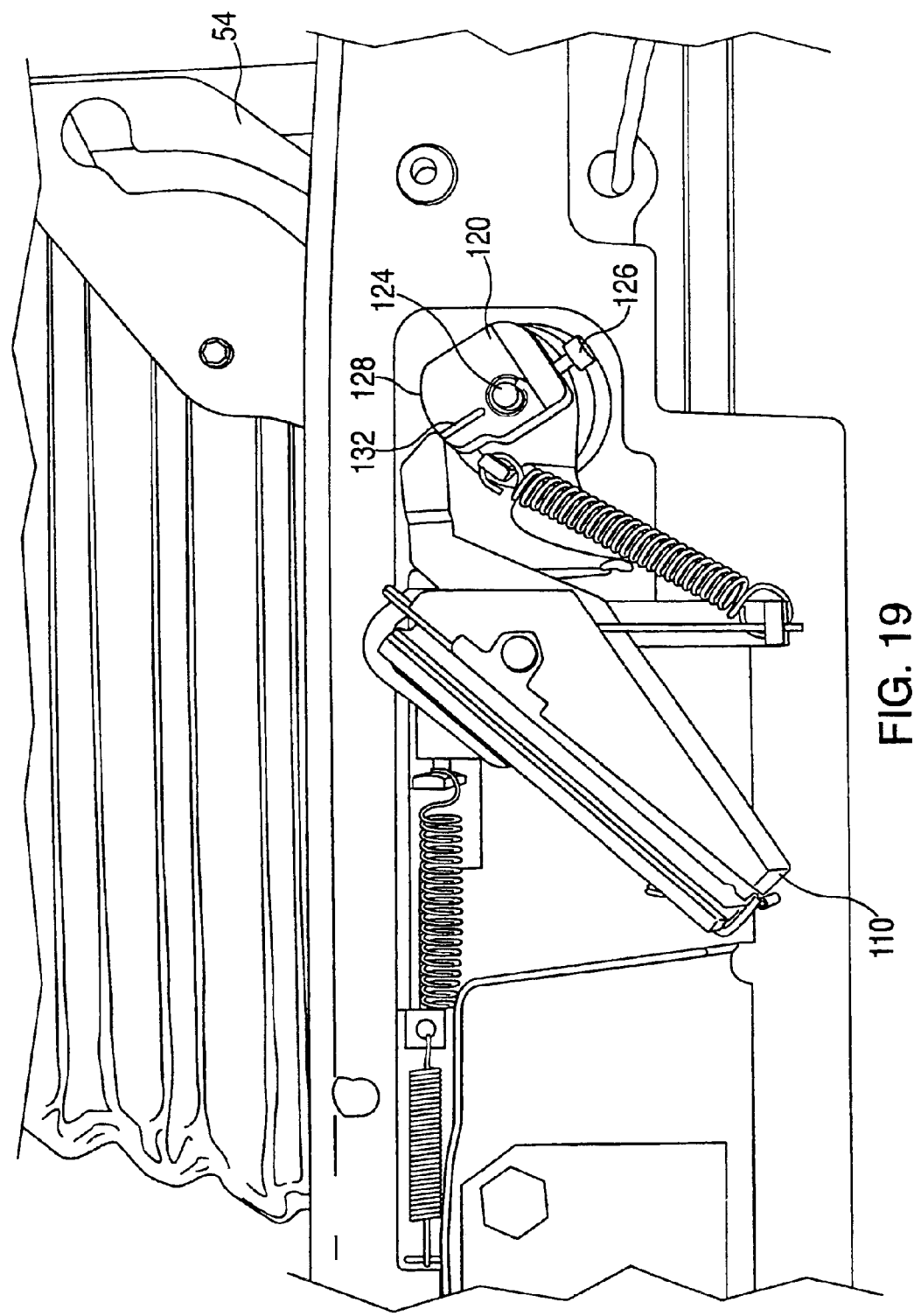
FIG. 19 shows an improved pivoting cam for the coupled rangefinder/parallax 4×5 camera of the present invention.

As shown in FIG. 19, the secondary mirror assembly 110 is controlled by a pivoting cam 120 mounted on a stud 124. The coupled rangefinder/parallax assembly includes the coupled rangefinder/parallax 90, secondary mirror assembly 110, and pivoting cam 120, which are housed in a plastic housing. The opposite end of the stud 124 is connected to the coupling focusing arm 115 (now shown). The original pivoting cam 120 is set on the stud 124, and therefore, on the coupling focusing arm 115 by a brass flathead screw (not shown), which did not provide the necessary torque to effectively secure the pivoting cam 120. Furthermore, the end of the stud 124 where it meets the pivoting cam 120 is round and slippery. To improve traction between the stud 124 and the pivoting cam 120, the stud 124 is knurled with a knurling tool such that the pivoting cam 120 is held much more effectively. To provide the necessary torque, the flathead screw is replaced with a new $\frac{2}{56}$ inch steel alien socket head screw 126. The curvature of the curved edge 128 of the pivoting cam 120 corresponds to a specific lens. The original camera has a standard notch 132 etched into the cams 120 to indicate the standard position when the lens is focused to infinity. This standard notch 132 is not applicable to the coupled rangefinder/parallax 4×5 camera 45 of the present invention because no two lenses have identical focal length, which is more critical on a 4×5 format than smaller formats and lenses, and lenses are composed of multiple elements or each has minute differences in curvature that when combined to produce an image projected onto a focal plane, these differences from lens to lens requires that the pivoting cam 120 drives the rangefinder to have slightly different curvature for each specific lens. Therefore, cams 120 with different curvatures need to be re-cut to provide for lens with focal lengths of 90 mm, 100 mm, 68 mm, 135 mm and 150 mm. For verification of the curvature of the pivoting cam 120 in relation to a specific lens, focus the rangefinder accurately at minimum, medium and maximum distance to achieve all three focus points in coordination with the lens and the curvature of the cam 120 must reflect a displacement equal to that of the focusing train 55.

Figure 20D:
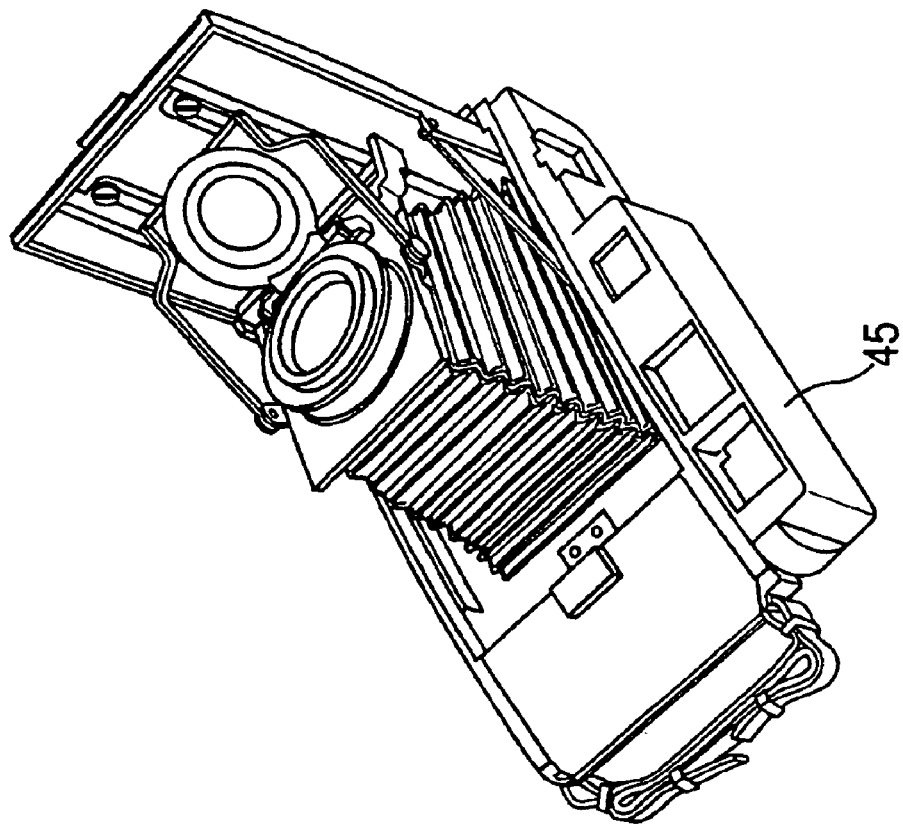
FIG. 20 shows different views of the completed coupled rangefinder/parallax 4×5 camera of the present invention.
Figure 20C:
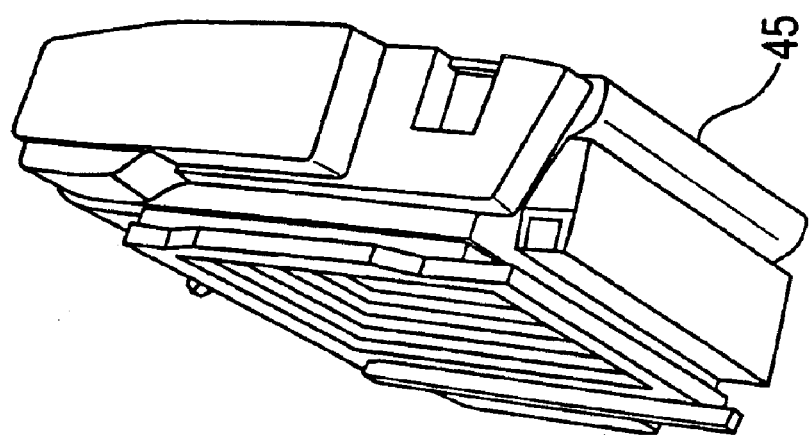

FIG. 20 shows different views of the completed coupled rangefinder/parallax 4×5 camera of the present invention.

It is understood that the above described modification of a 3¼×4¼ format camera to a 4×5 format camera may be performed on other 3¼×4¼ format body shells not having a coupled rangefinder/parallax combination, such as Models 110A or 120. Additionally, other 3¼×4¼ format camera from other companies may be similarly converted to a 4×5 format camera.

Although certain features of the invention have been illustrated and described herein, other better modifications and changes will occur to those skilled in the art. It is, therefore, to be understood that the appended claims are intended to cover all such modification and changes that fall within the spirit of the invention.

What I claim is:

1. A camera comprising:
    a body shell from a 3¼×4¼ format camera selected from the group consisting of Polaroid Models 110, 110A, 110B, 120, 150, 160, 800 and 900 cameras;
    a coupled rangefinder/parallax assembly from a 3¼×4¼ format camera selected from the group consisting of Polaroid Models 110B and 900 cameras on said body shell;
    means for holding films; and
    an adaptor between said body shell and said holding means.

2. The camera of claim 1 wherein said holding means comprises a camera back.

3. The camera of claim 1 wherein said holding means comprises a film holder.

4. The camera of claim 2 wherein said camera back is a camera back other than a camera back selected from the group consisting of Polaroid Models 110, 110A, 110B, 120, 150, 160, 800 and 900 cameras.

5. The camera of claim 2 wherein said camera back is a camera back having a format other than a 3¼×4¼ format film.

6. The camera of claim 1 further comprising:
   a coupled rangefinder/parallax housing from a 3¼×4¼ format camera selected from the group consisting of Polaroid Models 110B and 900 cameras enclosing said couple rangefinder/parallax assembly.

7. A camera comprising:
   a body shell from a 3¼×4¼ format camera selected from the group consisting of Polaroid Models 110, 110A, 110B, 120, 150, 160, 800 and 900 cameras;
   a lens and a corresponding washer attached to said body shell;
   means for holding films; and
   an adaptor between said body shell and said holding means.

8. The camera of claim 7, wherein said lens is a lens other than a lens selected from the group consisting of Polaroid Models 110, 110A, 110B, and 120 cameras.

9. The camera of claim 7, wherein said washer is a washer other than a washer selected from the group consisting of Polaroid Models 110, 110A, 110B, 120, 150, 160, 800 and 900 cameras.

10. A camera comprising:
    a body shell from a 3¼×4¼ format camera selected from the group consisting of Polaroid Models 110, 110A, 110B, 120, 150, 160, 800 and 900 cameras;
    a focusing door pivotally mounted to said body shell;
    a focusing train slidably mounted on said focusing door;
    a lens board mounted substantially normal to and on said focusing train;
    a bellows connecting said body shell to said lens board;
    means for holding films having a predetermined film format; and
    an adaptor between said body shell and said holding means.

11. The camera of claim 10 wherein said bellows having a length sufficient to accommodate a full range of motion on said focusing train.

12. The camera of claim 10 wherein said bellows having a size sufficient for said predetermined film format.

13. A camera having a different size format converted from a 3¼×4¼ format camera comprising:
    a body shell from a 3¼×4¼ format camera selected from the group consisting of Polaroid Models 110, 110A, 110B, 1120, 150, 800 and 900 cameras having a front shell and a rear shell;
    an adaptor having opposite sides, wherein one side of said adaptor is adapted to accept the different size format films and the opposite side is mounted to said rear shell.

14. A camera comprising:
    a body shell from a 3¼×4¼ format camera selected from the group consisting of Polaroid Models 110, 110A, 110B, 1120, 150, 800 and 900 cameras;
    means for holding films; and
    an adaptor between said body shell and said holding means.

15. The camera of claim 14 wherein said holding means comprises a camera back.

16. The camera of claim 14 wherein said holding means comprises a film holder.

17. The camera of claim 1 further comprising:
    a focusing door pivotally mounted to said body shell;
    a focusing train slidably mounted on said focusing door; and
    means for close up capabilities.

18. The camera of claim 1 further comprises means for providing an infinity locking element.

19. A 4×5 camera comprising:
    a body shell;
    a coupled rangefinder/parallax assembly from a 3¼×4¼ format camera selected from the group consisting of Polaroid Models 110B and 900 cameras on said body shell;
    means for holding films; and
    an adaptor between said body shell and said holding means.

* * * * *